(12) United States Patent
Fomme

(10) Patent No.: US 7,890,280 B2
(45) Date of Patent: Feb. 15, 2011

(54) METHOD AND A SYSTEM FOR DETERMINING A PHYSICAL PROPERTY AS A FUNCTION OF POSITION

(75) Inventor: Martin Fomme, Cologne (DE)

(73) Assignee: LIOS Technology GmbH, Köln (DE)

( * ) Notice: Subject to any disclaimer, the term of this patent is extended or adjusted under 35 U.S.C. 154(b) by 155 days.

(21) Appl. No.: 12/174,144

(22) Filed: Jul. 16, 2008

(65) Prior Publication Data
US 2009/0103072 A1    Apr. 23, 2009

(30) Foreign Application Priority Data
Jul. 20, 2007    (DK) ................ 2007 01077

(51) Int. Cl.
*G01R 23/00*    (2006.01)
(52) U.S. Cl. ................... 702/75; 702/85; 701/301; 701/302; 374/137; 374/E15.001; 367/134; 367/135; 356/301; 356/310; 356/331; 345/469
(58) Field of Classification Search .......... 702/75, 702/85; 701/301, 302; 374/137, E15.001, 374/E11.001; 367/134, 135; 356/301, 310, 356/331; 345/469
See application file for complete search history.

(56) References Cited

U.S. PATENT DOCUMENTS

| 5,862,517 A * | 1/1999 | Honey et al. ................... 702/85 |
| 6,366,236 B1 * | 4/2002 | Farmer et al. ............... 342/195 |
| 2005/0219512 A1 | 10/2005 | Froggatt et al. |
| 2009/0240455 A1 * | 9/2009 | Fromme et al. ............... 702/85 |

FOREIGN PATENT DOCUMENTS

| EP | 0 692 705 | 1/1996 |
| EP | 1 548 416 | 6/2005 |
| EP | 1787098 A1 | 5/2007 |
| WO | 2006/027369 | 3/2006 |

OTHER PUBLICATIONS

XP002545411 Microwave and Optical Technology Letters (USA) / vol. 33, No. 2, Apr. 20, 2002; "An Inexpensive Distance Measuring System for Navigation of Robotic Vehicles".
European Search Report (Extended), Dated From Oct. 6, 2009.

* cited by examiner

*Primary Examiner*—Mohamed Charioui
*Assistant Examiner*—Elias Desta
(74) *Attorney, Agent, or Firm*—Norris McLaughlin & Marcus, PA; Chrisla Hildebrand, Esq.

(57) ABSTRACT

A method and system for determining a physical property as a function of position. A data series including data point from one or more channels is obtained by frequency modulation continuous wave. A number of data points correspond to Nda different values of frequency of modulation. One or more processing steps are performed including at least part of said primary data series to obtain at least one secondary data series comprising N (N>Nda) data points from the values of frequency of modulation. The secondary data series from frequency domain is transformed to obtain at least one back scattering curve in space domain, and optionally the back scattering curve(s) to one or more physical properties as a function of position.

25 Claims, 19 Drawing Sheets a.)   b.)

c.)

METHOD AND A SYSTEM FOR DETERMINING A PHYSICAL PROPERTY AS A FUNCTION OF POSITION

BACKGROUND OF THE INVENTION (1) Field of the Invention

The invention relates to the field of measurement systems, such as optical measurement systems, e.g. systems for measurement spatial distributed physical properties by means of a sensor, e.g. an optical sensor.

The invention relates specifically to a method determining a physical property as a function of position based on the principle of frequency modulated continues wave (FMCW). In particular for a measurement system based on optical frequency domain reflectometry (OFDR).

(2) Description of Related Art

Typically a FMCW backscattering measurement system, such as an optical FMCW backscattering measurement system, comprises an excitation part, an evaluation part and a longitudinal extended sensor. For an optical FMCW system said sensor is typically an optical waveguide, typically an optical fiber, whereas for an electrical FMCW system a typical sensor is an electrical cable. The excitation part is adapted for exciting a series of frequency modulated signal in the sensor and the evaluation part then receives the response of the sensor to said signals, thus mapping the response as a function of frequency, which is referred to as the frequency data or the data in the frequency domain. Based on said response and a transformation from frequency domain to spatial domain one or more physical parameters of spatial distributed measurement points of the sensor along its length between the first and second end may be extracted.

A radar FMCW system may e.g. be used for determining distance to and velocity of an object. An optical FMCW backscattering measurement system may be applied to measure one or more physical parameters (typically temperature and/or strain) along an optical fiber. An electrical FMCW system may e.g. be used for monitoring the spatial distribution of temperature along an electrical cable, cf. e.g. EP-1 548 416.

BRIEF SUMMARY OF THE INVENTION

The present invention provides a novel method and a novel system for determining a physical property such a temperature as a function of position said method has shown to be surprisingly effective and provides high quality determinations. It has thus been found that the number of necessary data points to be measured compared to prior art determinations of similar quality may be reduced with little or no performance loss and/or with little or no performance loss relative to the specifications normally required by the application for which the FMCW system is used.

According to the invention it has thus been found that determining a physical property with a desired quality may be obtained using a reduced measurement and accordingly changes of the determined property may be registered relatively fast.

The method of determining a physical property as a function of position according to the invention comprises processing a data series obtained by FMCW. The data series comprising data points from one or more channels, the method comprising a. measuring a number of data points, corresponding to $N_{da}$ different values of frequency of modulation $\{f_{m,0}, f_{m,1}, f_{m,n}, \ldots, f_{m,Nda}\}$, thereby obtaining at least on primary data series from each channel, b. performing one or more processing step comprising at least part of said primary data series to obtain at least one secondary data series comprising N data points for the values of frequency of modulation $\{f_0, f_1, f_n, \ldots, f_N\}$, c. performing a transformation of said secondary data series from frequency domain to obtain at least one back scattering curve in space domain, d. optionally relating said back scattering curve(s) to one or more physical properties as a function of position, wherein $N > N_{da}$.

In this context N may be viewed as the number of measured data points and $f_N$ is the maximum measured data point that would be applied in a FMCW system when the present invention is not implemented. As most FMCW operate in reflection mode the transformed data is referred to as the backscattering profile as it, within a factor and/or a magnitude shift, reflect the relation between back-reflected excitation signal and position along the sensor. Depending on the system one or more backscattering profiles may be obtainable and one or more of these may then be related to one or more physical parameters as a function of position referred to as profiles, such as a temperature profile.

A FMCW system often operates by recording data in one or more channels where signal is separable between each channel often based on a physical property. In one embodiment each channel is fed by a separate detector where signal is divided between detectors based on a physical property such as wavelength for optical FMCW systems. In another embodiment each channel is measured sequentially with an adjustable filter to select the desired signal for each member of the sequence. In yet another embodiment separation into channels may occur as a matter of signal analyses after the signal has been recorded by one or more detectors. In one embodiment one or more of the mentioned types of channels are combined in the system.

A data point corresponds to the measured value of a phase and amplitude for a single frequency measurement, where the term single frequency is to be understood broadly since most excitation sources and modulators will have a non-zero bandwidth. Accordingly, a single frequency refers to an interval of frequencies which is short relative to the interval of the minimum and maximum frequencies being measured in a cycle. In one embodiment the width of said interval is substantially identical to the measurement bandwidth of the modulation of the excitation source.

A coordinate set is the (often complex) values of one or more channels corresponding to the same frequency of modulation or set of frequencies of modulation.

A data series is formed by a collections of data points or coordinate sets e.g. at different frequencies of modulation. Processing of the data such as to extract temperature information, often includes relating signals from two or more channels. The shape of a data series when plotted, such as amplitude and/or phase, is referred to as the signature.

The term an 'optical FMCW backscattering measurement system' is in the present context taken to mean an optical FMCW measurement system based on the frequency modulation of a light beam (pump light) that is backscattered from one or more continuously scattering optical media (typically an optical fibre) or/and from one or more optical reflectors (Fresnel reflection at the fibre ends, plugs, lenses, mirrors, etc.). The backscattered light comprises the same wavelength as the pump light or/and additionally light at different wavelengths due to non-linear optical effects. The characteristic of the backscattered light is dependent on physical (force, strain, pressure, temperature, etc.) and/or chemical (moisture, corrosion, sulphurous, etc.) and/or electromagnetic (fluorescence, radiation, etc.) parameters of the continuously scattering media or/and reflectors.

An optical backscattering system may e.g. comprise a modulated laser source, a sensor for sensing a spatially distributed measurement of a physical quantity (e.g. temperature, force, humidity, etc.) in the form of an optical waveguide, e.g. an optical fibre, mixing, filtering and receiving elements (including opto-electronic converters), signal processing and calculation units for transforming and evaluating the backscattered signal(s) and for determining the spatially distributed profile of the physical quantity in question.

The term an 'optical FMCW backscattering measurement system' is considered to comprise systems based on heterodyne measurement technology (optical or electrical).

By using optical heterodyne measurement technology in an optical FMCW backscattering measurement system, the mixing of the pump signal and the backscattered signal may take place in the exit optical paths from a Michelson Interferometer. These kinds of optical FMCW techniques are also termed 'OFDR techniques' or 'coherent FMCW techniques'.

By using electrical heterodyne measurement technology in the optical FMCW backscattering measurement system, the mixing of the pump signal and the backscattered signal take place in the electrical receiver module. These kinds of electrical FMCW techniques are also termed 'incoherent OFDR techniques'.

The terms 'OFDR' (optical frequency domain reflectometry) and 'optical FMCW backscattering' are used interchangeably in the present application.

In an embodiment, the frequency modulation of the laser comprises a modulation of the intensity of the laser light at different frequencies. Per measurement cycle the laser frequency is chirped, either step-wise or continuously, between a lower frequency and an upper frequency. This frequency range is commonly adapted to provide the desired spatial resolution of the optical FMCW device. The number of frequency measurement points is typically chosen to provide the desired measurement distance (typically corresponding to the length of the measurement fibre) and the measured frequency spacing is typically chosen to provide the desired spatial resolution of the FMCW device.

One relevant type of optical FMCW system is a Raman backscattering measurement system adapted for measuring a spatially distributed temperature profile. Typically the received sensor signal comprises a Stokes Raman backscattered signal and in some instances signal comprises an Anti-Stokes Raman backscattered signal. One method of determining the temperature profile is based on the Stokes and Anti-Stokes Raman backscattered signals. Alternatively Rayleigh scattering may be used to evaluate the temperature in conjunction with the Anti-Stokes signal and one may combine these methods.

In other relevant application the extracted physical parameters of spatially distributed measurement points of the sensor along its length are used to determine parameters, such as moisture, corrosion, sulphurous, pressure, force, radiation, etc.

A typical application of a FMCW system is monitoring, i.e. measuring one or more physical parameters at spatial distributed measurement points of the sensor and updating said measurement commonly at regular time intervals referred to as measurement cycle time or just cycle time. In the context of the present application cycle time is to be understood as the time wherein a measurement system is capable of performing a complete measurement in the sense that it is ready to begin a new measurement at the end of the cycle. In general, a measurement cycle consists of all steps for determining the profile of the physical parameter(s) or at least the backscattering profile(s). This will typically comprise measuring the frequency data, perform any corrections and/or other data processing/analysis of the frequency data, calculation of one or more backscattering curves, calculation of the ratio/relation of backscattering curves, calculation of the temperature profile. Depending on the application the maximum allowable cycle time may be limited for example by standards or regulations.

An example of such an application is fire detection where a FMCW system, commonly an OFDR system, may be applied to monitor the temperature along an optical fiber cable laid out in the structure to be monitored e.g. a tunnel or a building.

Typical performance parameters of measurement are cycle time, resolution of the physical parameter(s) and spatial resolution for a dedicated length of optical sensor fibre. Depending on the desired application different performance parameters are required. One example is fire detection where temperature events with a high dynamic rate must be detected. A suitable compromise of parameters may provide a short measurement cycle time, while the temperature resolution and the spatial resolution is of less importance. In other applications, such as temperature monitoring in power cables or oil wells, the highest possible temperature resolution is desired for detection of gradual small changes in the temperature profile.

In the field of FMCW the inverse Fourier transform (IFFT) is commonly applied as part of the data processing. Therefore, optimization of the performance parameters usually considers that the spatial resolution and the maximum measurable distance of the system are determined by the choice of parameters chosen for the IFFT. Measured data is commonly considered to reside in the frequency domain, i.e. the data is mapped as a function of frequency, and an inverse Fourier transform is applied to transform the measured data from the frequency domain to the spatial domain where data is mapped as function of position. In practice, said inverse Fourier transform is commonly performed via an IFFT. The IFFT routine assumes equally spaced data points and provides optimum performance with data sets consisting of $2^n$ data points, where n is an integer. Commonly one or more steps of data processing is included prior and/post application of the IFFT, such as averaging, noise reduction, and windowing. Windowing is commonly performed to reduce the commonly present smearing and/or ringing in the spatial domain due to the inverse Fourier transform of a finite data series. Furthermore, it is speculated that harmonic distortion may be eliminated by identification of such distortions in the spatial domain and eliminating these by a fitting algorithm in the frequency domain at relevant frequencies. Harmonics in the spatial domain are relatively straight forward to determine and will rarely be real under normal conditions. The identification would likely require an algorithm with the ability to separate real events from harmonic "measurement artifacts". The eliminating fitting algorithm would preferably be recursive to find the best fitting values.

While the application of an IFFT is commonly considered preferable, the transformation from the frequency domain to the space domain may in principle be performed by any suitable mathematical transformation. One may, as example, instead interpolate between data points and perform a continuous or semi-continuous Fourier transform. Furthermore, in principle the transformation need not be a Fourier or inverse Fourier transformation as any transformation transforming data to a data set which may be related to the position may be applied. In the following the terms Fourier transform, inverse Fourier transform, IFFT, and fast Fourier transform (FFT) will be applied to describe the transformations applied as these are common choices in the field. However, these terms should be regarded as examples and should be considered replaceable by any suitable mathematical transformation and/or any suitable approach to handle discrete data.

The data point corresponding to the highest frequency, $f_N$, determines the spatial resolution after transformation by an IFFT, whereas the number of data points, N, determines the maximum range of the measurement.

The invention may e.g. be useful in applications such as measurement of spatially distributed physical parameters, e.g. temperature, humidity, force, in large installations, e.g. along roads, in tunnels, in tubes or cables, in industrial equipment, etc.

An example of a prior art FMCW backscattering system to which the present invention would be relevant is described in EP-1 548 416.

Typically, the obtained data series and resulting backscattering curve, and the optionally obtained relation of a physical property to position along the sensor, is comprised in a single measurement cycle in a monitoring system. Accordingly, in several embodiments the at least one backscattering profile is determined to update a previously determined physical property as a function of position. In one preferred embodiment the same set of frequencies are measured in each cycle, so that the set of measured frequencies of modulation $\{f_{m,0}, f_{m,1}, f_{m,n}, \ldots, f_{m,Nda}\}$ is substantially identical to the set of measured frequencies of modulation applied to determine the previously determined physical property as a function of position. In another embodiment the set of frequencies is varied between cycles preferably in a rolling manner so after a predetermined number of cycles all of the frequencies represented in the secondary data series has been measured at least once. Accordingly, it may be preferred that the set of measured frequencies of modulation applied to determine the previously determined physical property as a function of position in at least one of the following ways: the number of measured frequencies of modulation, one or more values of the measured frequencies of modulation is omitted, and one or more values of the measured frequencies of modulation is added.

As the collection of data points may be a significant part of the cycle time of a system the invention may provide one or more of several advantages where the reduction of required cycle time is utilized to extend the capability of the system design. Examples comprise longer range, measuring along multiple fiber cables, noise reduction by averaging. In another example, the relaxation of the constraint of the number of data points may be applied to reduce the requirements to the measurement electronics as more time is available to measure a single data point.

Typically a Raman-OFDR system measures in three channels where a detector collects light from the anti-stokes line, the stokes-line and the reference lines, respectively. The reference line commonly having the same wavelength as the light source. Other FMCW systems may apply less or more channels.

For a Raman-OFDR a coordinate set will commonly refer to the values for the anti-stokes line, the stokes-line and the reference line. However, it may also be referred to as a data series for each channel. In a preferred embodiment where the FMCW system comprises multiple channels one or more channel is processed separately according to the invention. In another embodiment two or more channels are processed in parallel. During processing data from the measurement channels for the Stokes and Anti-Stokes lines may be related to the phase and magnitude of the reference channel. For a FMCW system utilizing a single channel a coordinate set equals a data point.

To obtain N data points said processing steps preferably comprises filling in data points with a filling series $\{f_{f,0}, f_{f,1}, f_{f,n} \ldots f_{f,N-Nda}\}$ comprising values of frequency of modulation not included in $\{f_{m,0}, f_{m,1}, f_{m,n}, \ldots, f_{m,Nda}\}$. The data points of said secondary data series is preferable adapted to the chosen method of transformation. For IFFT or FFT the secondary data series preferably comprise $2^N$ data points equidistant relative to frequency to optimize performance of these algorithms.

In a preferred embodiment $N_{da}$ is less than or equal to 90% of N, such as less than or equal to 80%, such as less than or equal to 80%, such as less than or equal to 70%, such as less than or equal to 60%, such as less than or equal to 50%, such as less than or equal to 40%, such as less than or equal to 30%, such as less than or equal to 20%, such as less than or equal to 10%.

The filling series may be said to comprise fill values or filling values. In one preferred embodiment said filling series comprises previously measured data points. For a monitoring system such previously measured data points may be provided by previous measurement cycles, such as the previous measurement cycle and/or the 2nd previous measurement cycle and/or one or more older measurement cycles such as a measurements cycle older than 2 cycles, such as older than 3 cycles, such as older than 4 cycles, such as older than 5 cycles, such as older than 6 cycles, such as older than 7 cycles, such as older than 8 cycles, such as older than 9 cycles, such as older than 10 cycles, such as older than 20 cycles. However, previously measured data may also comprise data obtain as a part of optimization/calibration process. Depending on system stability such calibration/optimization is preferably performed once in the life time of a system, when performance degradation dictates a recalibration, at regular intervals and/or when one or more components of the systems is altered such as during and/or after maintenance. In one preferred embodiment previously measured data points comprise and average of previously measured data point such as a rolling average. The application of an averaged value is preferably conditional so that an average is only used if one or more of the last measured value fulfils one or more predetermined constraints for example that the value must be within a set interval around the previously measured value and/or a average of two or more previously measured values.

In one preferred embodiment said filling series comprises data points based on the primary data series and/or one or more previously measured primary data points, such as interpolated values, averages and/or the value of the closest measured data point. Examples of data points based on the primary data may be interpolated values and average values such as an average value of two or more high frequency values to estimate the noise floor useful for providing unmeasured high frequency values. Other examples includes nearest measured value, an interpolated value based on one or more surrounding data points. Such an interpolation may be any suitable interpolation such as a linear interpolation, spline or the like. Another possibility for determining suitable fill values consists of the approximate continuation of the specific signature based on values from the primary data series such as in a preferred embodiment determining fill values for higher frequencies based from the measured lower frequency range. Of course the above discussed fill values may in one or more embodiment may be based in a similar manner on data sets from previous cycles, such as one or more previously measured primary data series and/or previously determined secondary data series, such as averaged data set(s).

In one embodiment said filling series comprises predetermined values such as 1, 0, and/or 1+j where j denotes the imaginary part. The advantages of the application of such values may be simplicity, which in turn may allow faster system performance and/or improved noise characteristics (see FIG. 11). Such values may also be applied as starting values if no previously measured values are available.

In one embodiment the data points of primary data series and filling series are located in one or more respective non-overlapping intervals and/or in one or more respective overlapping intervals.

Non-overlapping intervals of in the filling series are preferably used for parts of the spectrum, i.e. an array of frequencies, which is expected to experience few changes between cycles. It is speculated that this is particularly the case when the spectrum is influenced significantly by the noise floor of the measurement system as this is likely to be independent of the physical property to be measured. For FMCW systems a decay of the signal as a function of frequency is often observed. Accordingly, in this case it is speculated that applying a filling series for high frequency values will at most degrade the resulting distribution of the physical property to a small degree. It is speculated that for some applications using a suitable filling series for higher frequencies may improve the noise characteristics of the system as the filling series may be less influenced by noise in this region, such as when a single fill value is used (see FIGS. 10 and 11), when averaged previously measured is used and/or when predicted/interpolated values are used. Preferably, filling series comprises an interval non-overlapping with the primary data series said interval having a lower limit of less than $0.95 \cdot f_N$, such as less than $0.9 \cdot f_N$, such as less than $0.8 \cdot f_N$, such as less than $0.7 \cdot f_N$, such as less than $0.6 \cdot f_N$, such as less than $0.5 \ f_N$, such as less than $0.4 \cdot f_N$, such as less than $0.3 \cdot f_N$, such as less than $0.2 \ f_N$, such as less than $0.1 \ f_N$. However, other parts of the spectrum may also be suitable for filling values. Such as near DC (i.e. for small frequency values) which primary reflects the average value of the physical property. Accordingly, in one embodiment the filling series comprises an interval non-overlapping with the primary data series said interval having a higher limit of more than $0.1 \cdot f_N$, such as more than $0.2 \cdot f_N$, such as more than $0.3 \cdot f_N$, such as more than $0.4 \cdot f_N$, such as more than $0.5 \cdot f_N$, such as more than $0.6 \cdot f_N$, such as more than $0.7 \cdot f_N$, such as more than $0.8 \cdot f_N$, such as more than $0.9 \cdot f_N$.

Overlapping intervals are preferably applied in frequency intervals where a significant contribution to the resulting distribution of the physical property is to be measured. In a preferred embodiment where the filling series and the primary data series comprises an overlapping frequency interval where the data points of the filling series has an average spacing $\Delta f_f$ and the data points of the primary data series has an average spacing $\Delta f_m$. Depending on how sensitive a particular frequency is expected and/or determined to be to changes it may be preferable to adjust the average spacing $\Delta f_m$ of the primary data series accordingly. A highly sensitive area should have a low $\Delta f_m$ providing a high density of measured data points. In one preferred embodiment where the signature decays as a function of frequency is preferable to increase $\Delta f_m$ as a function of frequency, such as step wise increase.

In one preferred embodiment the filling series comprises previously measured data. It is expected that large changes may produce artefacts when old data and new data are combined particularly when said change occurs from one cycle to the next. Such artefacts are expected to be particularly serious when previously measured data is applied in a filling series as part of an overlapping interval. In a preferred embodiment the data processing comprises a check for large changes in the signature relative to the part or the filling series comprising previously measured data is so that in such cases proper precautions may be taken. Preferable such a precaution comprises a re-measurement of the affected frequency interval(s).

However, for some applications, such as fire detection, the time constant for change of temperature may be more than the cycle time and/or the importance of detecting an accurate value of a change may be less significant then detecting said change. Accordingly, the mentioned average spacing of the primary and filling series in the said interval may be adjusted according to the application to provide the desired reduction of cycle time while maintaining sufficient system performance. Therefore, in a preferred embodiment the filling series and the primary data series comprises one or more intervals where such $\Delta f_f$ is equal to or less than $\Delta f_m$, such as $\Delta f_f$ equal to or less than $\frac{1}{2} \cdot \Delta f_m$, such as equal to or less than $\frac{1}{3} \cdot \Delta f_m$, such as equal to or less than $\frac{1}{4} \cdot \Delta f_m$, such as equal to or less than $\frac{1}{5} \cdot \Delta f_m$, such as equal to or less than $\frac{1}{3} \cdot \Delta f_m$, such as equal to or less than $\frac{1}{3} \cdot \Delta f_m$, such as equal to or less than $\frac{1}{4} \cdot \Delta f_m$, such as equal to or less than $\frac{1}{5} \cdot \Delta f_m$, such as equal to or less than $\frac{1}{6} \cdot \Delta f_m$, such as equal to or less than $\frac{1}{7} \cdot \Delta f_m$, such as equal to or less than $\frac{1}{8} \cdot \Delta f_m$, such as equal to or less than $\frac{1}{9} \cdot \Delta f_m$, such as equal to or less than $\frac{1}{10} \cdot \Delta f_m$. Further, the filling series and the primary data series may comprise one or more intervals where $\Delta f_f$ is equal to or more than $\Delta f_m$, such as $\Delta f_f$ equal to or more than $2 \cdot \Delta f_m$, such as $\Delta f_f$ equal to or more than $3 \cdot \Delta f_m$, such as $\Delta f_f$ equal to or more than $4 \cdot \Delta f_m$, such as $\Delta f_f$ equal to or more than $5 \cdot \Delta f_m$, such as $\Delta f_f$ equal to or more than $6 \cdot \Delta f_m$, such as $\Delta f_f$ equal to or more than $7 \cdot \Delta f_m$, such as $\Delta f_f$ equal to or more than $8 \cdot \Delta f_m$, such as $\Delta f_f$ equal to or more than $9 \cdot \Delta f_m$, such as $\Delta f_f$ equal to or more than $10 \cdot \Delta f_m$.

In one embodiment the filling series and the primary data series comprises an overlapping frequency interval where the number of data points in the filling series is equal to or more than the number of data points in the primary data series, such as equal to or more than 2 times the number of data point in the primary data series, such as equal to or more than 3 times the number of data point in the primary data series, such as equal to or more than 4 times the number of data point in the primary data series, such as equal to or more than 5 times the number of data point in the primary data series, such as equal to or more than 10 times the number of data point in the primary data series. However, in the same or another embodiment the filling series and the primary data series comprises an overlapping frequency interval where the number of data points in the primary series is equal to or more than the number of data points in the filling series, such as equal to or more than 2 times the number of data point in the filling data series, such as equal to or more than 3 times the number of data point in the filling data series, such as equal to or more than 4 times the number of data point in the filling series, such as equal to or more than 5 times the number of data point in the filling series, such as equal to or more than 10 times the number of data point in the filling series.

As previously discussed with regard to non-overlapping intervals the selection which frequency intervals to apply a filling series depend on the expected data and the application. Similarly for overlapping intervals which are expected to be beneficial for some application in intervals where substantial information is present in the data. However, it may also be advantageous to use overlapping intervals in the same cases where non-overlapping intervals could be applied. In such intervals it may improve accuracy while maintaining good system performance to have a low number of data points from the primary data series and a high number of data points from the filling series.

Accordingly, the choice of where to use overlapping intervals depend on the data and application. Therefore, it is preferred that said overlapping frequency interval has a beginning frequency $f_{min}$ and an end frequency $f_{max}$, where $f_{max}$ is a fraction of $f_N$, such as $1 \cdot f_N$, $\frac{3}{4} \cdot f_N$, $\frac{1}{2} \cdot f_N$, and $\frac{1}{4} \cdot f_N$. It also preferred, either in combination or alone, that $f_{min}$ is zero or a fraction of $f_N$, such as $\frac{3}{4} \cdot f_N$ N, $\frac{1}{2} \cdot f_N$, and $\frac{1}{4} \cdot f_N$.

As the filling series is specified to comprise frequencies not included in the primary data series the two series may not overlap at the end points. Accordingly, in this context the term overlapping should be interpreted so that a common frequency interval may be found which do include more data points either in the filling series or in the primary data series.

In one preferred embodiment it is preferable that the primary data series in one or more of the above discussed overlapping intervals comprises data points for a set of frequency values which is changed between two or more measurement cycles, such as a rolling change where a particular frequency is measured every $2^{nd}$ cycle or more rarely, such as every $3^{rd}$ cycle or more rarely, such as every $4^{th}$ cycle or more rarely, such as every $5^{th}$ cycle or more rarely, such as every $6^{th}$ cycle or more rarely, such as every $7^{th}$ cycle or more rarely, such as every $8^{th}$ cycle or more rarely, such as every $9^{th}$ cycle or more rarely, such as every $10^{th}$ cycle or more rarely.

It is speculated that in some cases application of the invention and particularly the filling series may provide increased system stability. This is particularly true when a filling series is applied for higher frequencies where little optical signal power is available due to the exponential decay of the amplitude of the data points as a function of frequency. For these frequencies significant noise may be introduced with little gain of information regarding the temperature profile. Accordingly, a low noise filling series such as an averaged distribution, a model data and/or a preset constant will provide less noise while system performance may be maintained.

The complex received electrical signal is advantageously represented as discrete measurements points in digital form, e.g. as a result of an A/D-conversion (analogue to digital conversion), and e.g. stored in an appropriate data storage medium (e.g. a memory of a DSP (digital signal processor)).

In an embodiment, more than one set of data for a particular received electrical signal (e.g. a Stokes signal or an Anti-Stokes signal) corresponding to a measurement cycle are stored in memory. In an embodiment, data from a number of measurement cycles of a particular signal are averaged before being applied as filling data.

The present invention further deals with an FMCW backscattering measurement system, such as an optical FMCW backscattering measurement system, comprising a computer readable medium having stored thereon a computer readable program code for performing the invention.

The term 'a computer readable medium' is in the present context taken to mean any appropriate means for storing program code including a diskette, a CD-ROM, a flash memory, a hard disk drive, RAM, etc. In an embodiment, the computer readable medium is part of or integrated with a PC, a micro-processor (e.g. a DSP) and/or programmable logic (such as FPGA).

The term 'a computer' is in the present context taken to mean any appropriate processing unit for executing program code, including a PC, a micro-processor, a DSP, etc.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF THE SEVERAL VIEWS OF THE DRAWING(S)

The invention will be illustrated in the following by means of the presented examples and corresponding drawings in which.

Figure 2A:
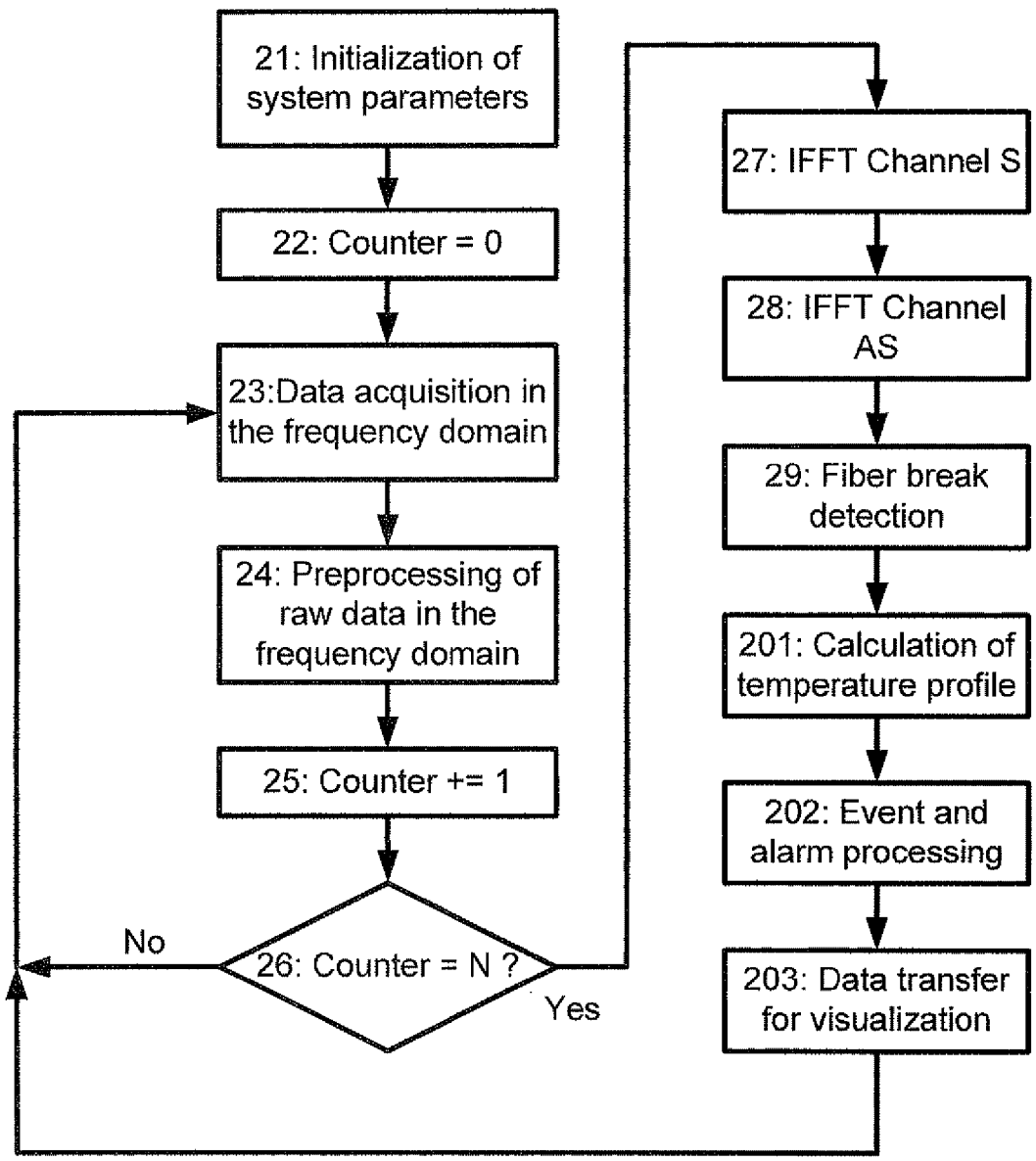
FIG. 2a shows an example of a flowchart of conventional data collection and processing in an FMCW system.
Figure 3A:
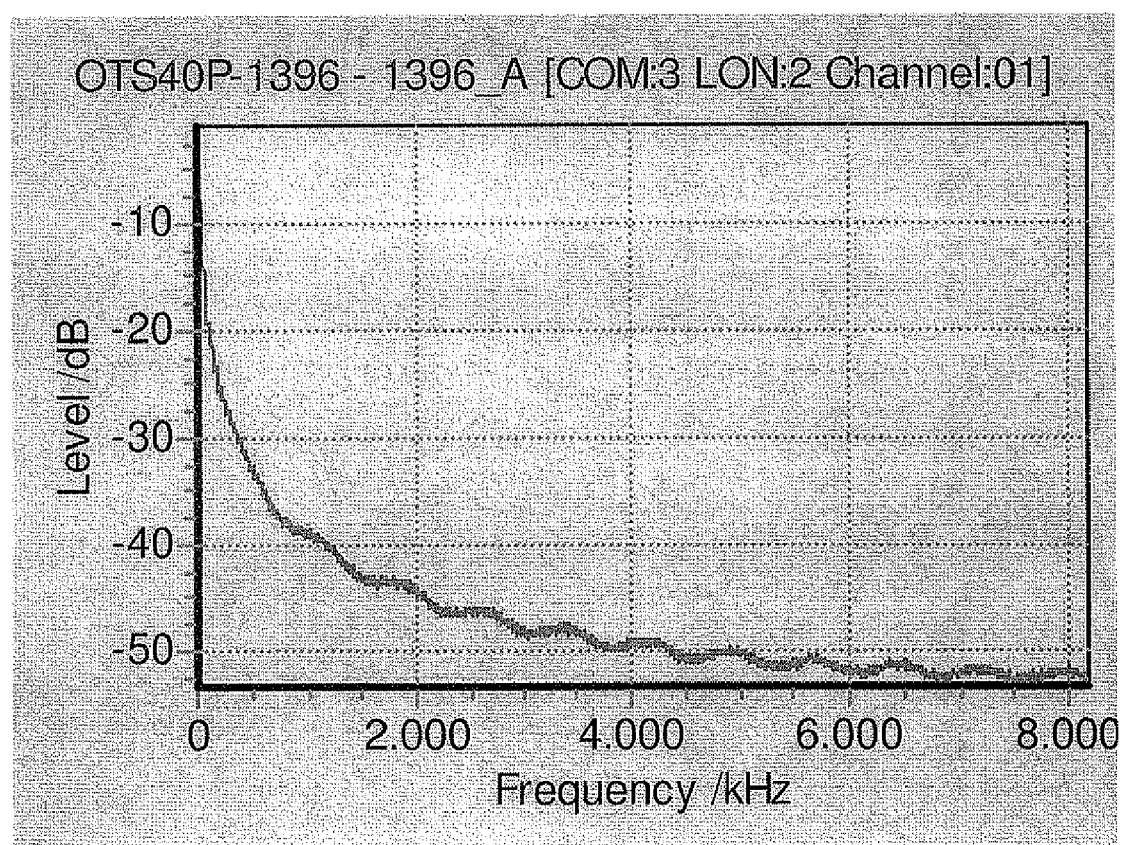
Figure 3B:
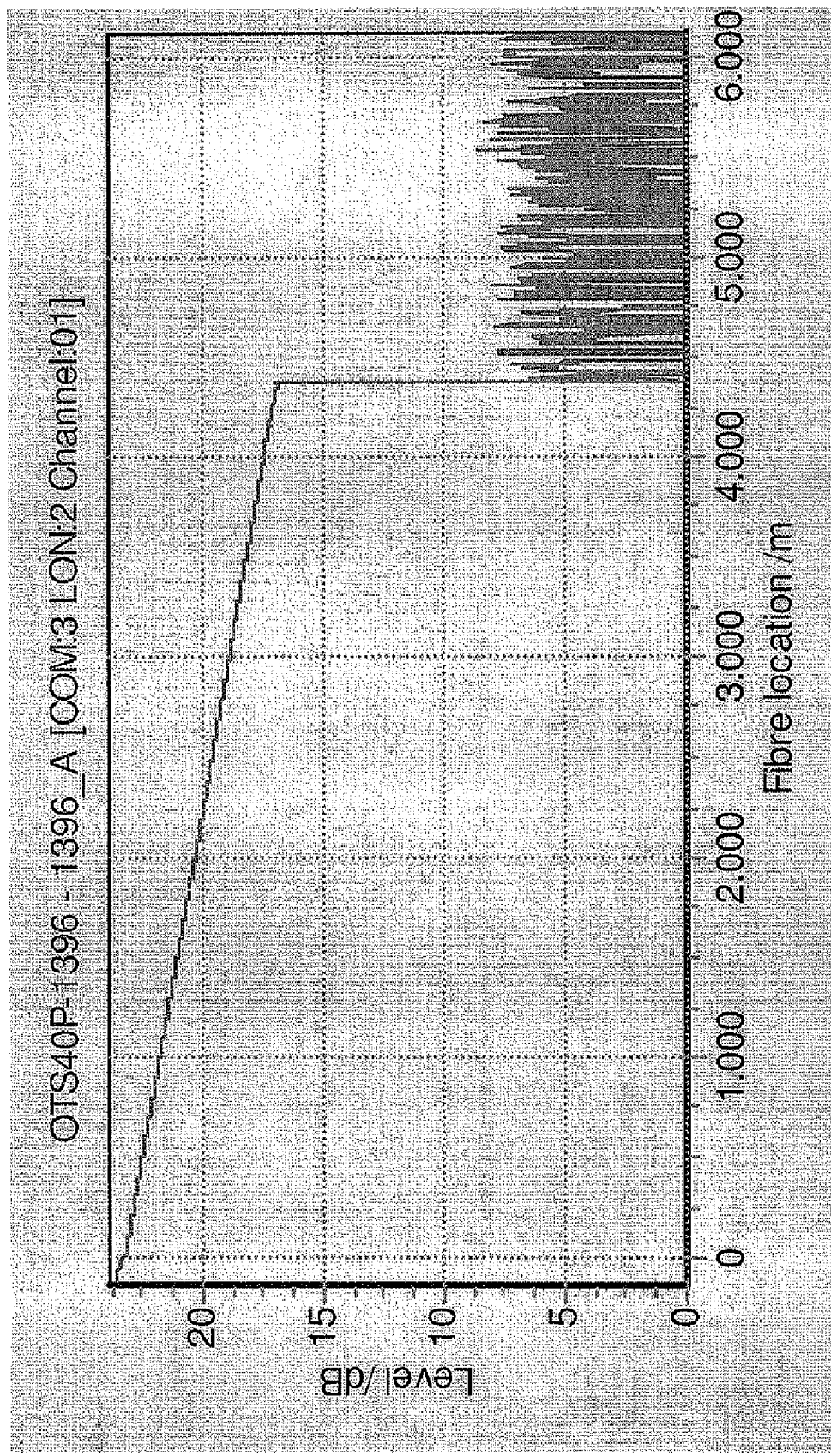
Figure 3C:
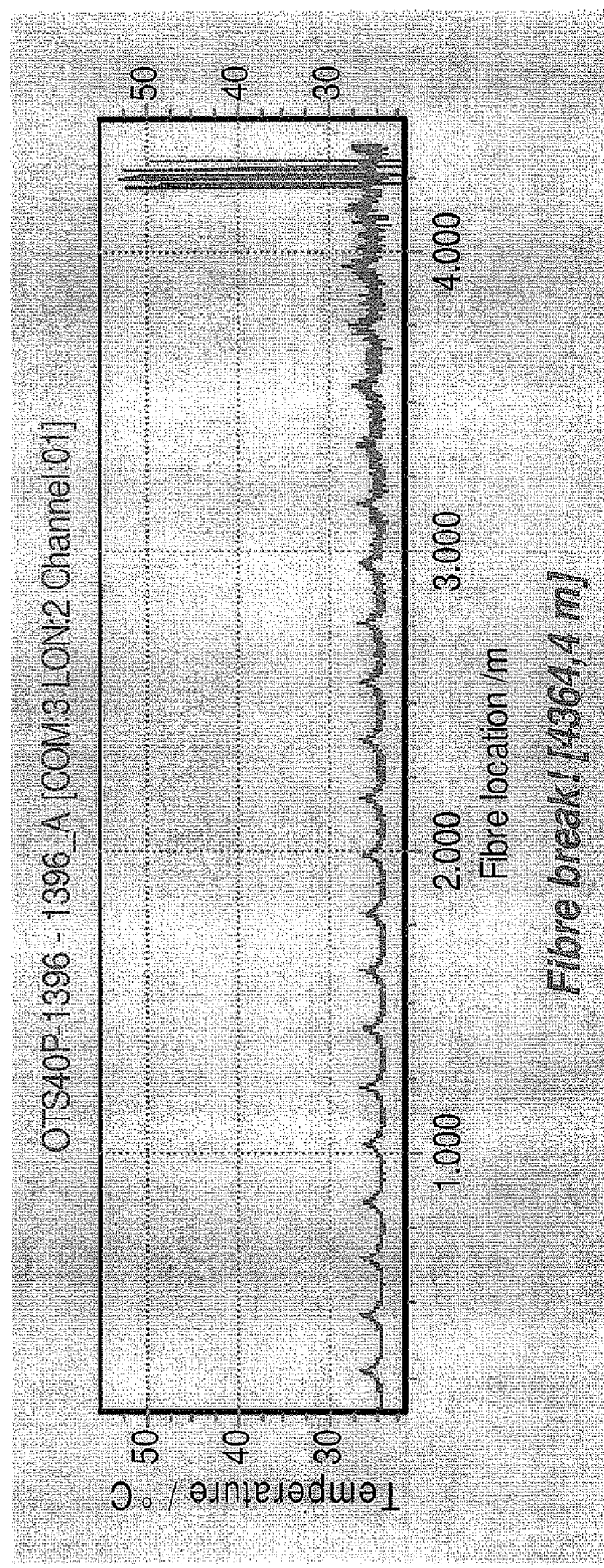

FIGS. 3a-3c show examples of data in different stages of data processing according to the flow chart of FIG. 2. FIG. 3a is a plot of measured data points (amplitude) versus frequency ranging from 0 Hz to 8 MHz. FIG. 3B shows an exemplary backscattering profile and FIG. 3C show the resulting calculated temperature profile.

Figure 4:
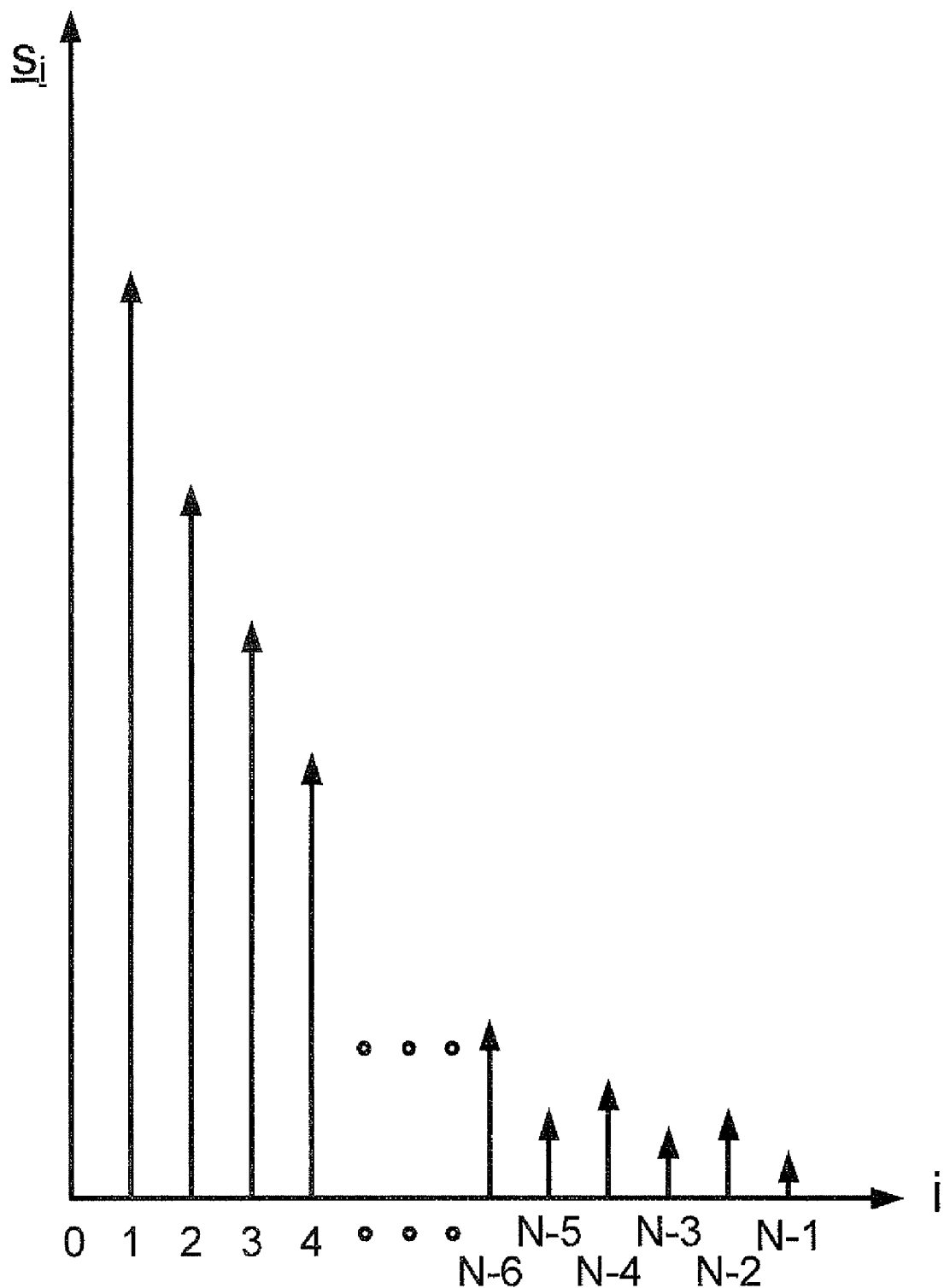

FIG. 4 shows an illustration of the measured dataset where the N data points (0 to N−1 data points in the frequency domain) each is a complex number $s_i$ designating the phase and amplitude of the measured response.

Figure 5A:
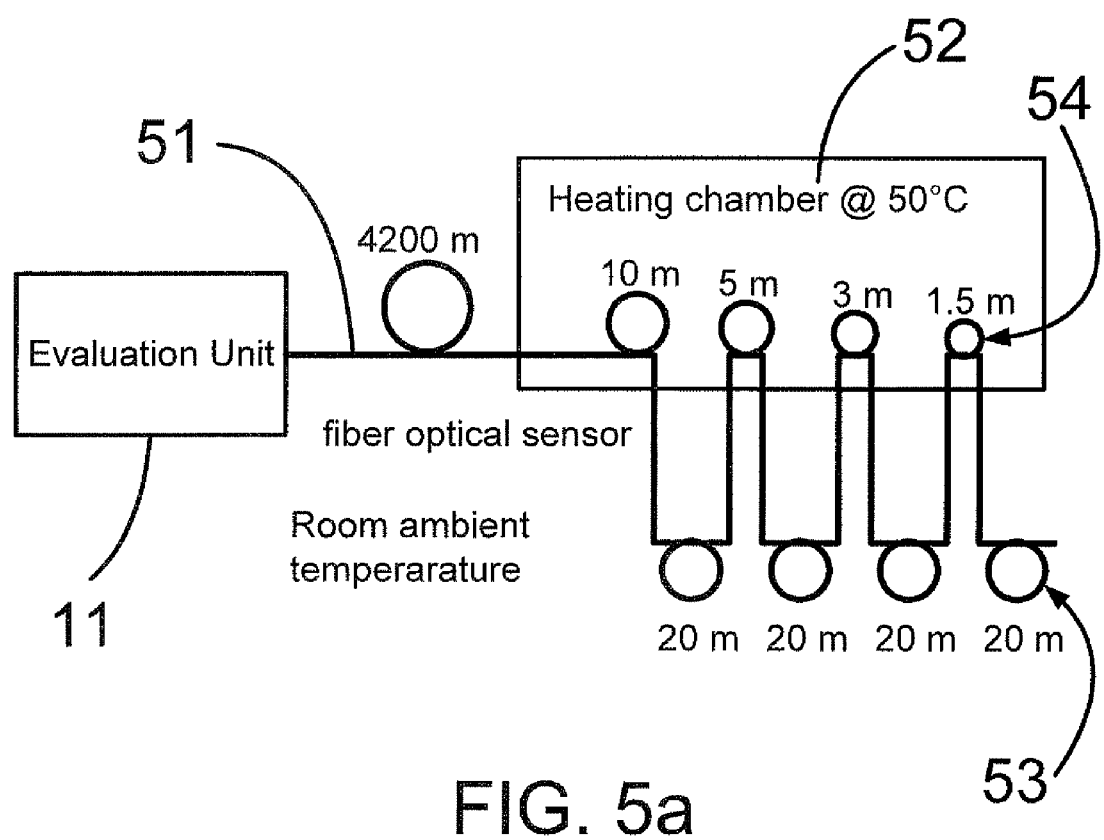

FIG. 5a shows a test layout comprising the system shown in FIG. 1. By this setup the accuracy and the spatial resolution of the system may be investigated.

Figure 5B:
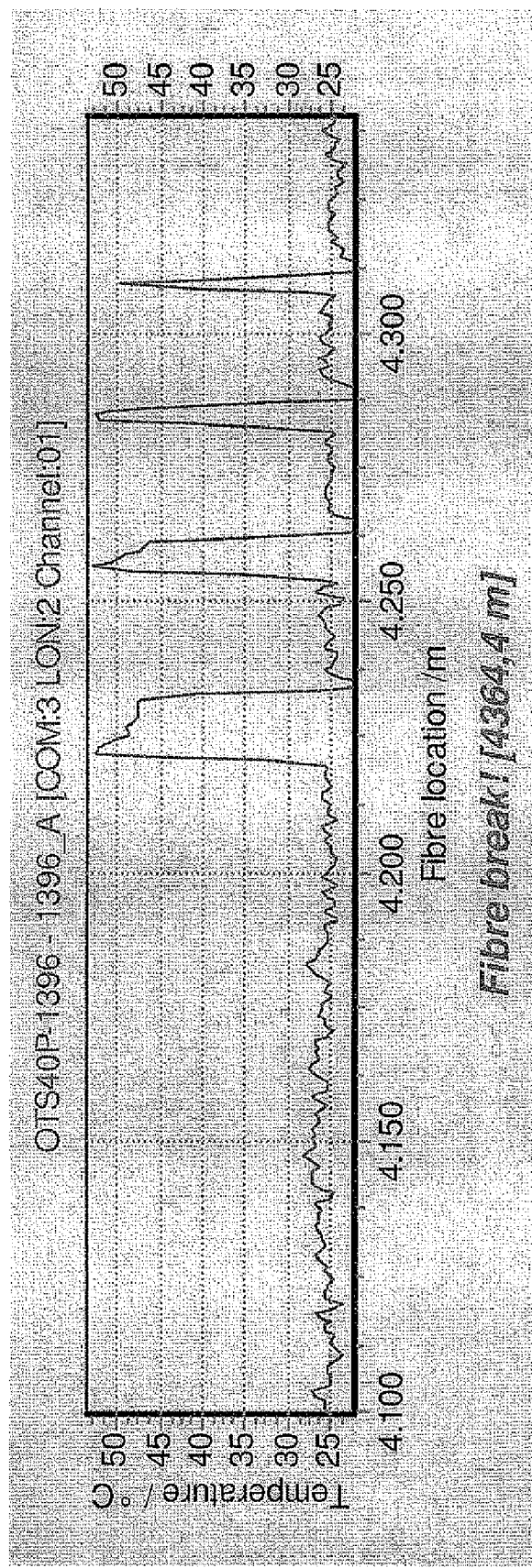

FIG. 5b shows an exemplary test result.

Figure 6A:
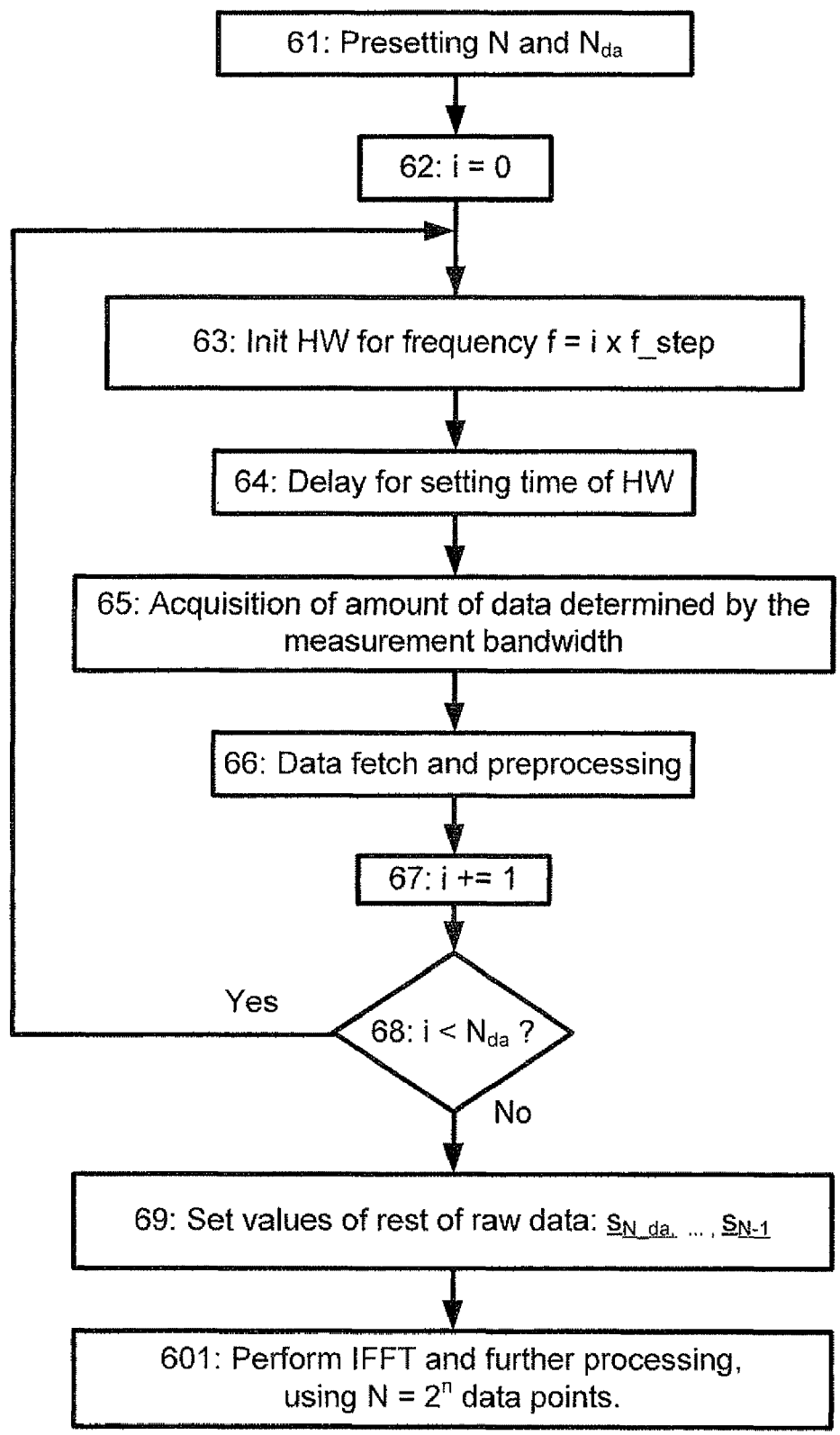

FIG. 6a is a flowchart of a measurement and data processing procedure according to the invention applied to an OFDR system as described in FIG. 1. In this example the primary data series consists of frequency data from DC to an upper value $f_{step} \times (N_{da}-1)$ and the filling series consists of frequency data for $f_{step} \times N_{da}$ to $f_{step} \times N$.

FIGS. 7a-7d show plots of temperature profiles for the setup shown in FIG. 5a obtained using the procedure outlined in FIG. 6 for different values of $N_{da}$.

Figure 8:
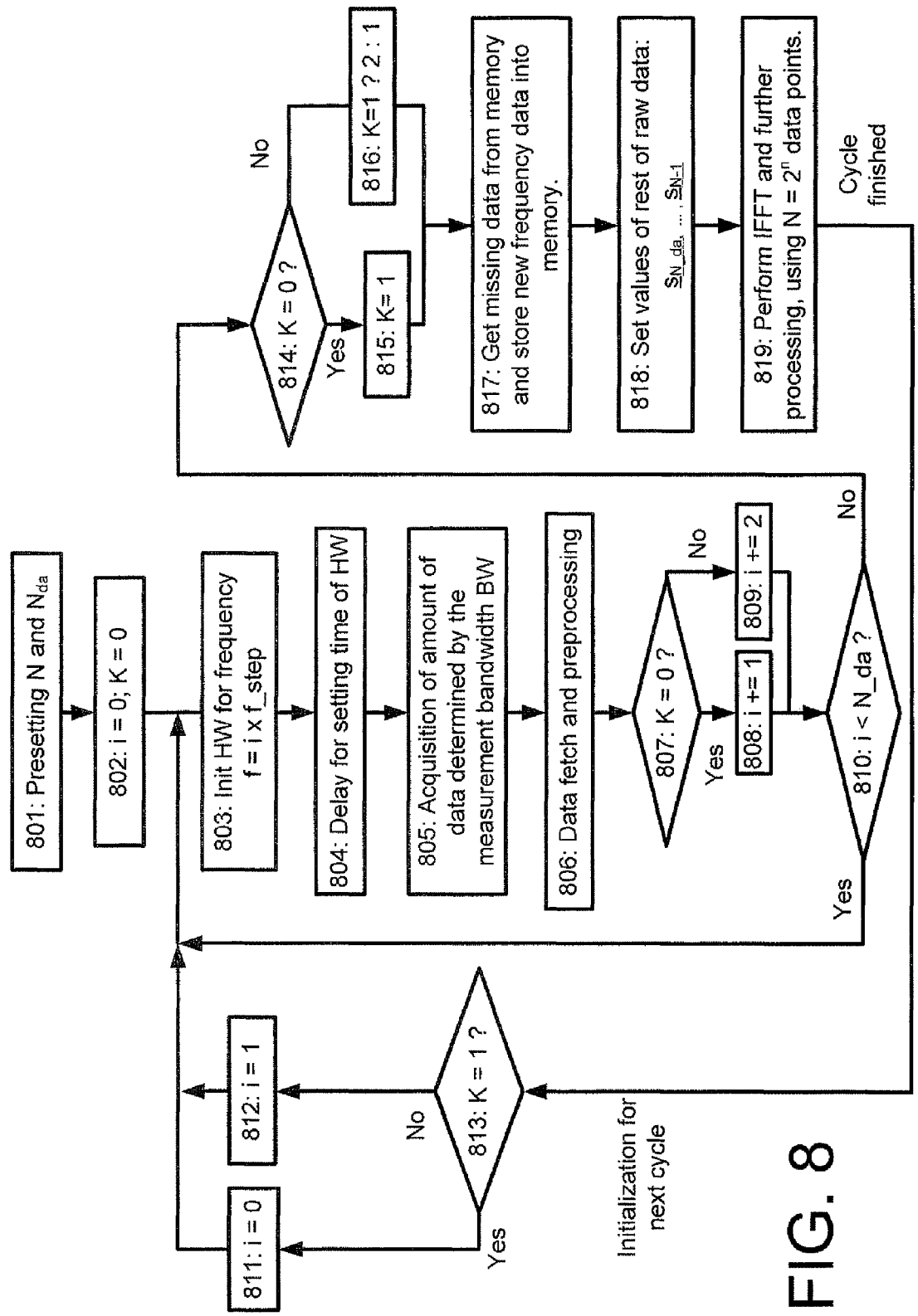

FIG. 8 is a flowchart of a measurement and data processing procedure according to the invention applied to an OFDR system as described in FIG. 1. In this example the primary data series comprises every other data point and the secondary data series fills in the remaining data points with data measured in the previous cycle.

Figure 9A:
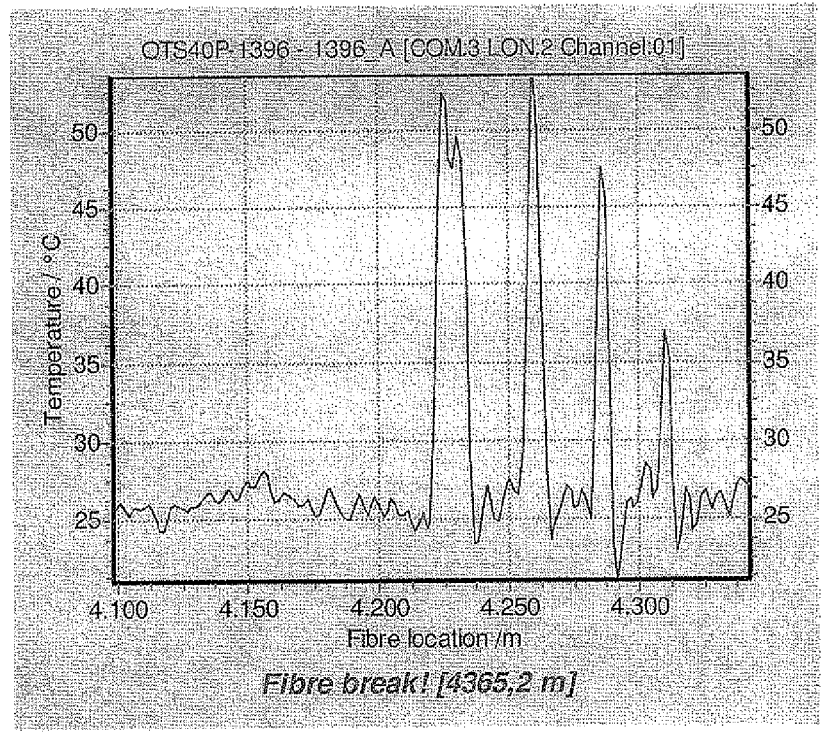
Figure 9B:
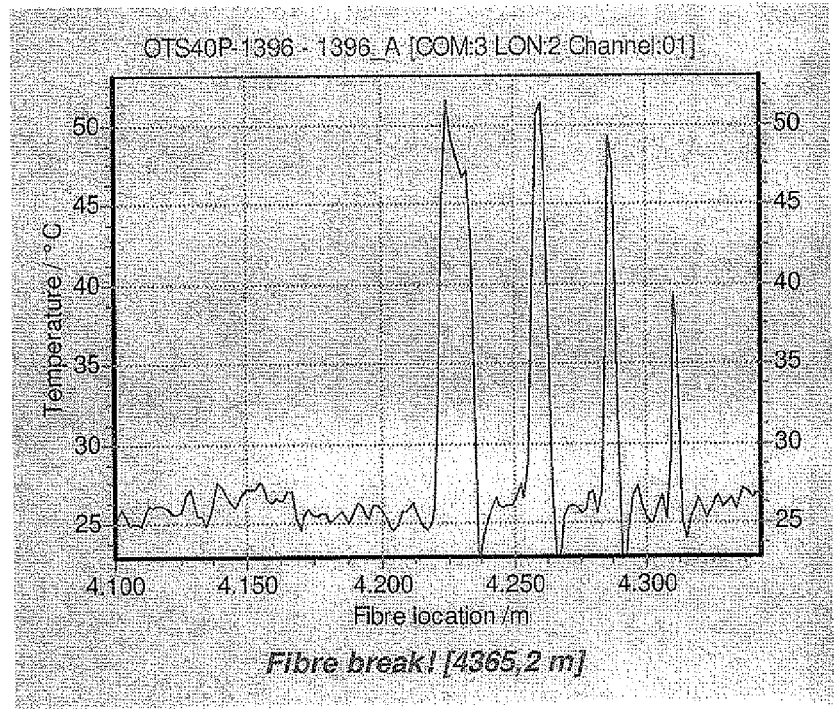

FIGS. 9a and 9b show plots of temperature profiles of the setup of FIG. 5 obtained by the procedure of FIG. 8.

Figure 10:
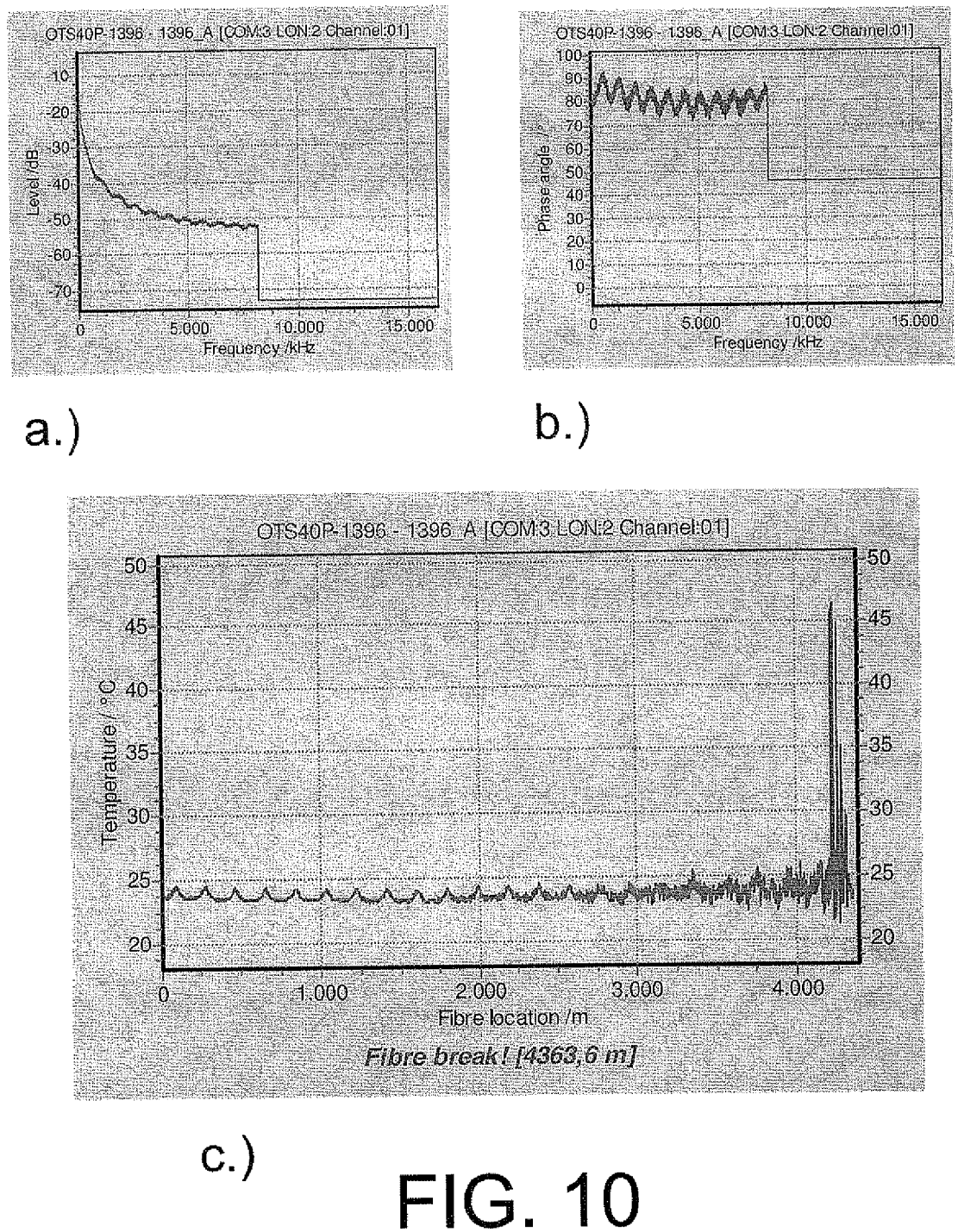

FIGS. 10a-c show plots of the amplitude (a) and the phase (b) of the secondary as well as the resulting temperature profile (c) for a secondary data series obtained by the procedure of FIG. 6 from a setup as FIG. 5, with a filling series consisting of 1+j as a filling value.

Figure 11:
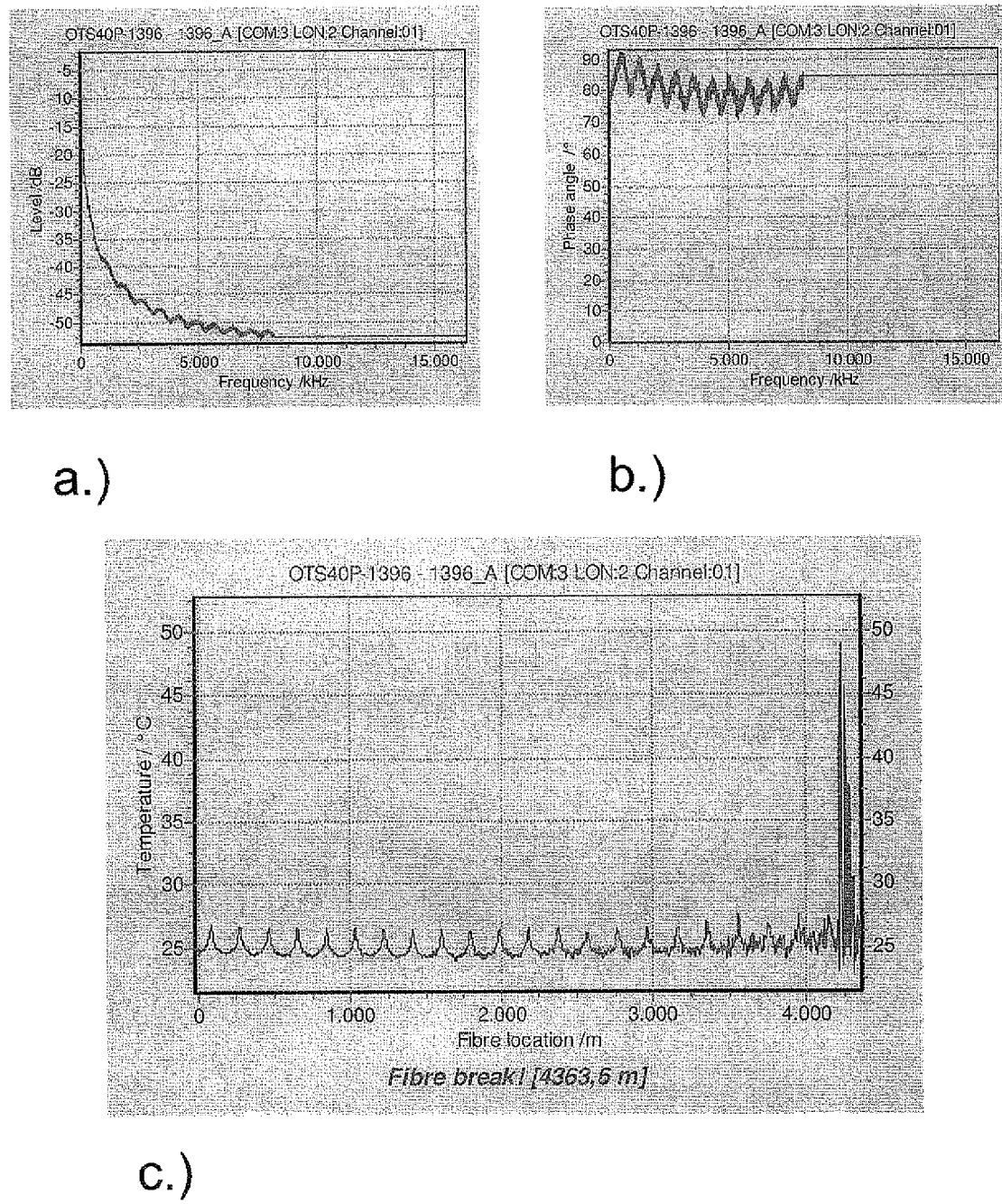

FIG. 11a-c show plots of the amplitude (a) and the phase (b) of the secondary as well as the resulting temperature profile (c) for a secondary data series obtained by the procedure of FIG. 6 from a setup as FIG. 5, with a filling series consisting of the last measured value as a filling value. The periodic peaks in the temperature profile are caused by the measurement being spooled on a drum exposed to slightly different temperature along the periphery.

Figure 12:
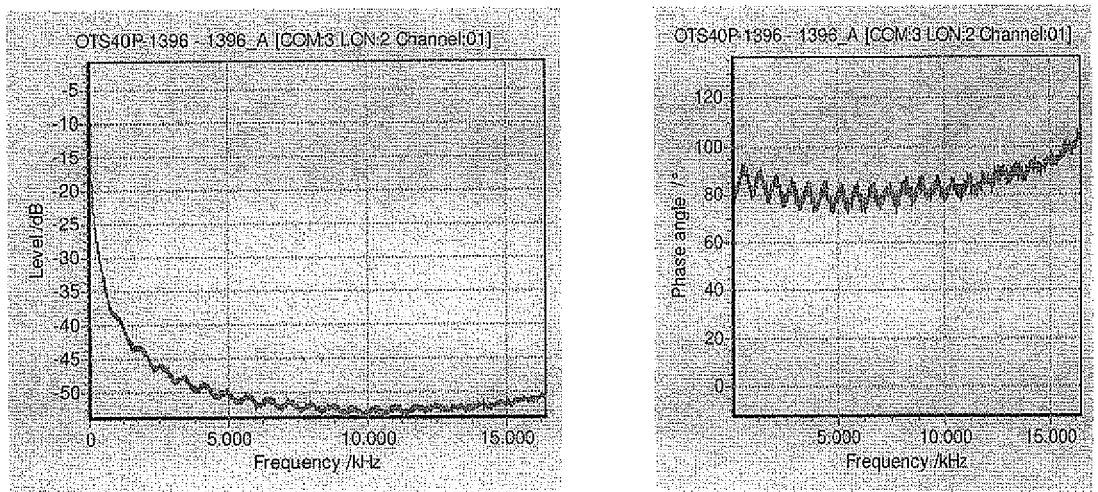
Figure 12:
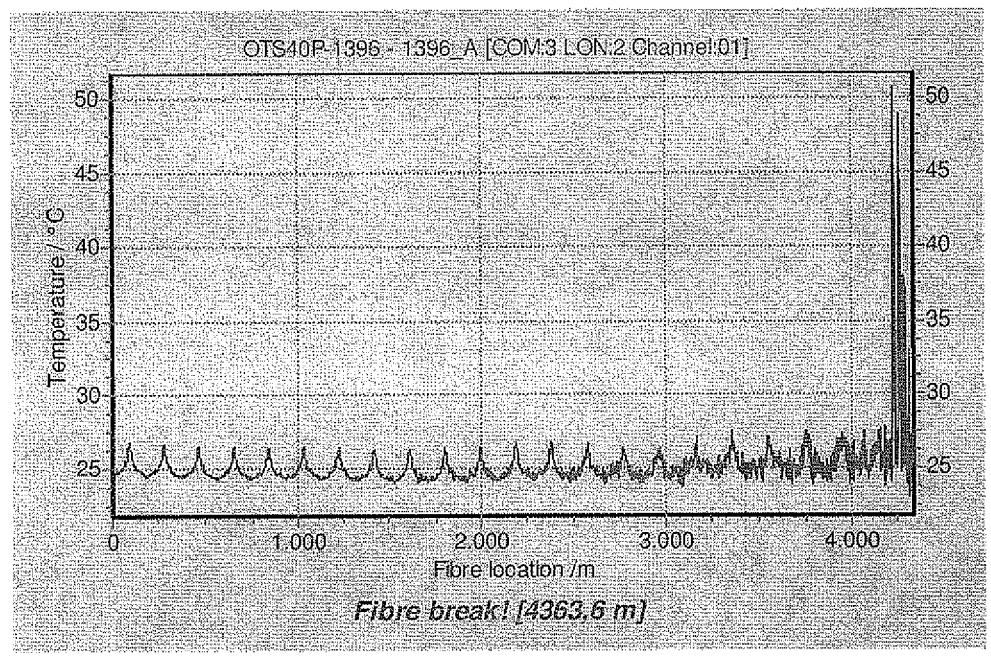

FIG. 12a-c show plots of the amplitude (a) and the phase (b) of the secondary as well as the resulting temperature profile (c) for a secondary data series obtained by the procedure of FIG. 6 from a setup as FIG. 5, with a filling series consisting of previously measured data.

DETAILED DESCRIPTION OF THE INVENTION

The figures are schematic and simplified for clarity, and they just show details which are essential to the understanding of the invention, while other details are left out.

Figure 1A:
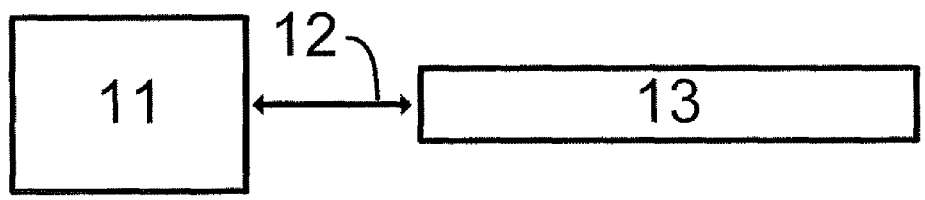
FIGS. 1a-1c show schematic illustrations of an optical FMCW measurement system comprising an excitation and evaluation unit and an optical sensor.
Figure 1B:
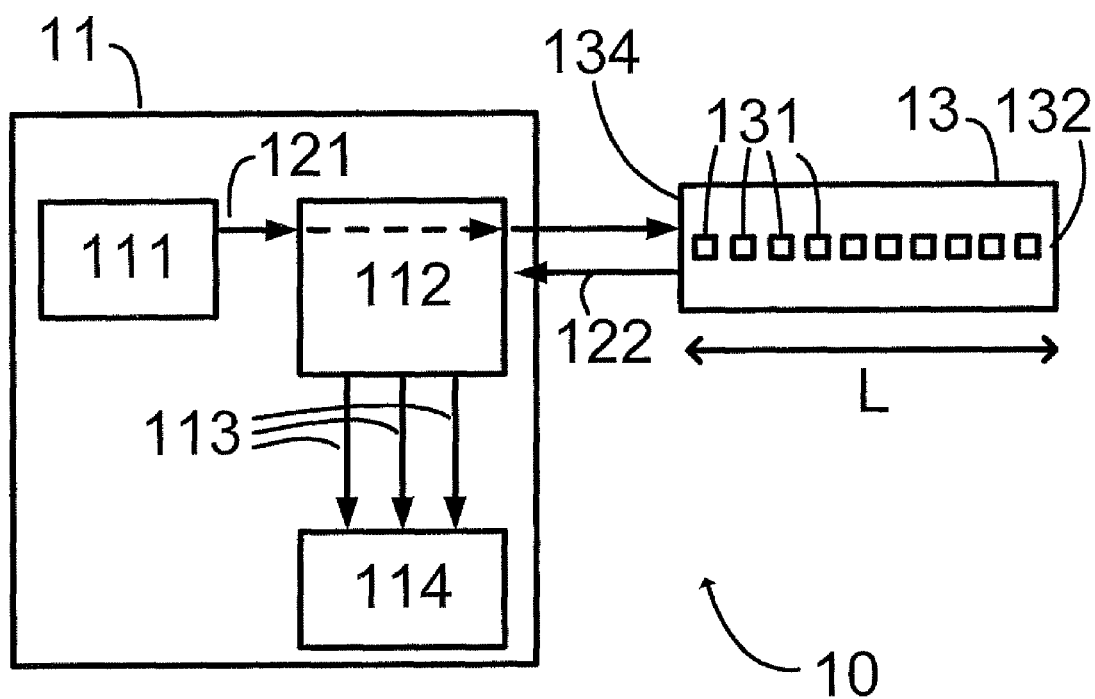
Figure 1C:
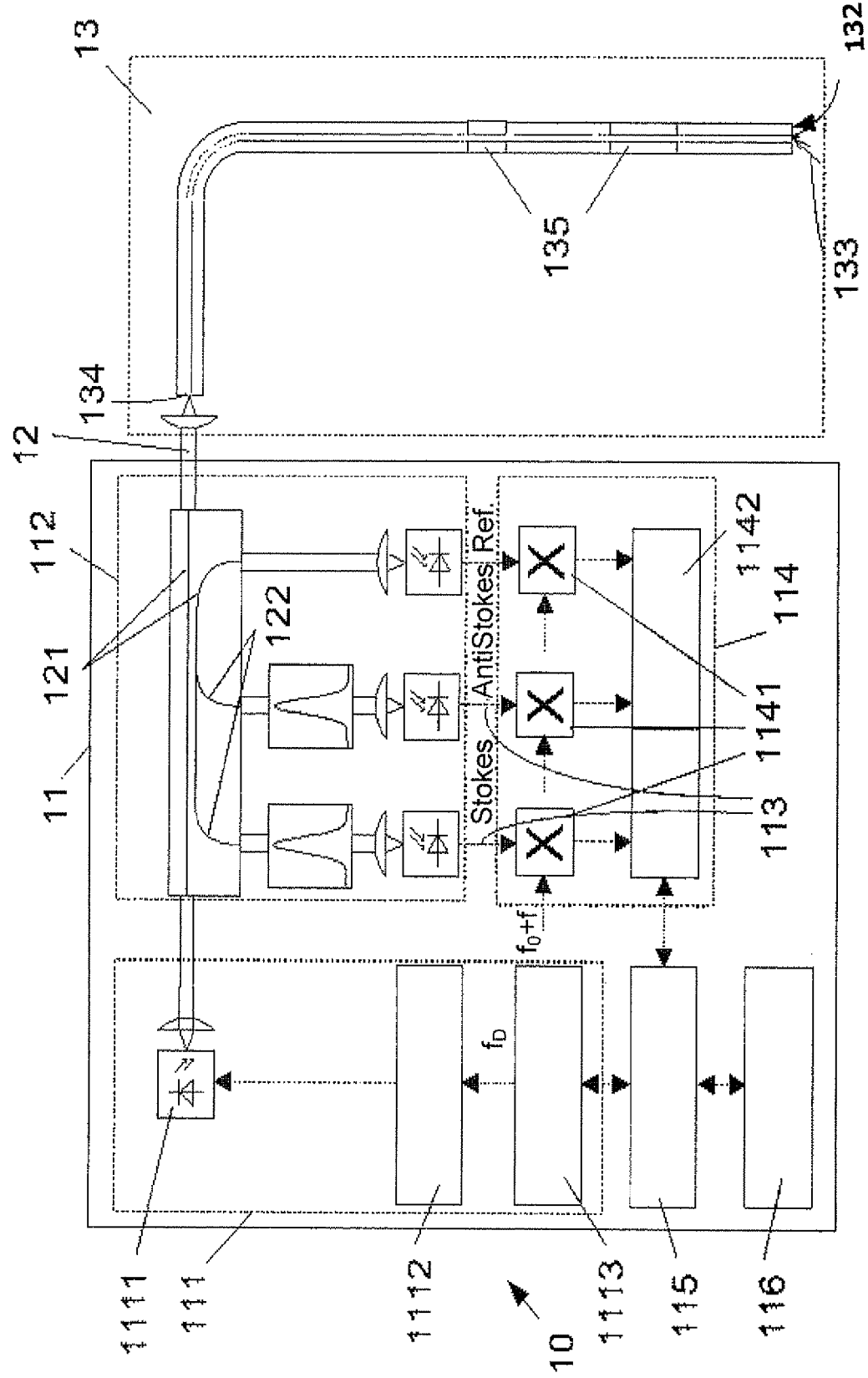

FIG. 1a-c shows schematic illustrations of a FMCW system, in this example an optical FMCW measurement system, comprising an excitation and evaluation unit and a sensor.

In FIG. 1a the optical FMCW backscattering measurement system 10 comprising an excitation and evaluation unit 11 is shown to optically interact (as illustrated by arrow 12) with optical sensor 13. In FIG. 1b excitation and evaluation unit 11 of the measurement system 10 is shown to comprise a light source 111, e.g. a laser such as a semiconductor laser exciting a frequency modulated light signal 121 into a first end 134 of optical sensor 13 (e.g. a length L of optical fibre, such as a silica fibre), the sensor having a second end 132, remotely located relative to the light source 111. The light signal 121 from light source 111 may optionally be modified (e.g. filtered and/or focused) before entering optical sensor 13 (as indicated by the dotted arrow within receiving unit 112). The optical component(s) (e.g. filters, splitters, lenses, etc.) responsible for the modification may fully or partially form part of receiving unit 112 or fully or partially be located elsewhere (e.g. as one or more separate units or forming part of sensor 13). Backscattered light signal 122 from optical sensor 13 is shown to be received by receiving unit 112 and signals 113 are forwarded from receiving unit 112 to processing and evaluation unit 114. The (backscattered) received light signal 122 comprises a data signal based on the frequency modulated light signal 121 from which physical parameters of spatially distributed measurement points 131 along the sensor 13 may be extracted. The measurement points 131 are distributed over a length L of the optical sensor 13.

FIG. 1c shows an exemplary optical FMCW backscattering measurement system 10 in the form of an optical temperature measurement system based on Raman back scattering. However, as discussed above the invention is expected to be applicable to any type of FMCW system.

The temperature measurement system 10 of FIG. 1c comprises an excitation and evaluation unit 11 comprising light source module 111 (comprising frequency generator 1113, laser 1111, and laser driver 1112), an optical receiver 112 (comprising filters and photo detectors as indicated by well-known symbols), an electrical receiver and evaluation unit 114 (comprising trans-impedance converters, mixers 1141, amplifiers, band pass filters, analogue-digital (A/D) converters and signal processing units 1142) and a temperature sensor 13 in the form of an optical fibre (possibly including input/output coupler components for coupling the light signal 12 in/out of the optical fibre). Possible sources of heat 135 are indicated in the sensor. The measurement unit 11 internally has an additional length of optical fibre used as a reference for the temperature calculation. This optical reference fibre is for practical reasons wound on a fibre spool which is located between the optical module 112 and the sensor 13. An optical switch may e.g. be used to measure the optical fibre 13 from both ends (134 and 132) to obtain optical fibre attenuation corrections. An additional option is to use an optical switch to measure several optical fibres with the same measurement unit (excitation and evaluation part 11). The light must be launched sequentially into the first end 134 of each of the multitude of sensors. The optical switch may be located between the reference spool and the sensor 13. These optional additional optical components (reference spool and optical switch) are not shown in FIG. 1. The system of FIG. 1 further comprises processing unit 115 and user interface 116. Cooperation between the various functional blocks is indicated by arrows.

The system comprises in the embodiment shown in FIG. 1c three channels, i.e. in addition to the two measurement channels (Anti-Stokes and Stokes), an additional reference channel. The output of the laser is amplitude modulated by a sinus signal whose frequency ($f_0$ in FIG. 1c, elsewhere termed $f_m$) is swept from a start frequency to an end frequency within a measurement time interval by means of a HF modulator. The resulting frequency modulated laser light 121 is coupled via the optical module 112 into a first end 134 of the optical waveguide 13. The light (including the Raman light) 122 which is continuously backscattered from every part (cf. points 131 in FIG. 1b) along the length of the fibre 13 is spectrally filtered in the optical module and converted into electrical signals via photo detectors. In one embodiment a part of the light from the light source module 111 is reflected at the second 132 (remote) end of the optical fibre and a part 133 is transmitted. In each finite volume 135 of fibre optical sensor 13 spontaneous Raman scattering appears in all directions. Only the part of Raman scattering directed backwards to the measurement unit 11 is received by the detector. The backscattered signal is furthermore attenuated by the fiber going from the point of scattering to the detector. The remote end of fibre 132 is preferably connected to an optical absorber. The received (measurement) signals 113 are amplified and mixed into the low frequency spectral range (LF range) providing a received (backscattered) electrical signal as a function of the laser modulation frequency $f_m$. The Inverse Fourier transform of the averaged LF signals result in two Raman backscattering curves (Anti-Stokes and Stokes). The backscattering curves show the attenuation profile of the intensity of the Raman scattering along the length of the optical fibre. The fibre temperature along the sensor cable is a result of the amplitude relationship (ratio) of the signals of the two measurement channels. Such a system and its use for measuring a distributed temperature or humidity or force profile is described in EP-0 692 705 and is commercially available in the form of a DTS-system (DTS=distributed temperature sensing) such as a controller OTS 40P from LIOS Technology GmbH, Köln, Germany.

FIG. 2 is a flowchart of an example of data collection suitable for the present invention in a FMCW system here exemplified by the OFDR system of FIG. 1 adapted to monitoring temperature along the measurement fiber. Any adaptation to other types of FMCW will be relatively straight forward for a skilled person. The procedure begins by initializing system parameters such as the bandwidth of measurement, the maximum frequency and the number of data points and the counter (steps 21 and 22). The loop 23-26 runs until the counter reaches N and N samples in the frequency domain has been recorded. In the present example a sample is measured by frequency modulated laser light 121 at the frequency to be measured and measuring the response in the three channels discussed regarding FIG. 1. In steps 27 and 28 an IFFT is performed on the measured data from the Stokes and anti-Stokes channels respectively. In step 29 a fiber break test is performed. In the event of a break of a measurement fiber the system should preferably detect this event separately. Suitable fiber break tests include the determination of a change of calculated end of fibre in comparison to the previous measured cycle on the basis of analysing the backscattering profiles. In case of a change determined the current measurement is to reject, and a "non-reduced" measurement is to perform.

Based on the inverse Fourier transformed data a profile of the physical parameter, in this case temperature, may be calculated 201. The method of calculating a temperature profile based on Stoke and anti-Stokes scattering is well-known is well published in the art. Then, depending on the application, the profile may be inspected to identify different types of events 202. In the case of fire detection regulations specify in detail what response characteristics are required for static and also dynamic events. Often the EN54-5, Part 1 is applied to DTS systems for fire detection in Europe. This standard e.g. specifies the allowed time frame in which an alarm has to be signalled, while a portion of sensor cable is linearly heated up in heating channel with different thermal gradients up to 30 Kelvin per minute. In the U.S.A. often the NFPA72 is applied. Here a comparison to rated heat-type sprinklers is performed to classify DTS system's response in case of fire. Accordingly, the temperature profile may preferably be checked for several gradients of temperature and maximum criterions at a dedicated fibre location or area. Other types of events include the detection of gradually small events for leakage detection or temperature monitoring for Oil&Gas or power cable applications even at high temperatures. Typical required measuring cycles are about 10s or below, while the time constant of sensor cable is about 60s in dependence on the design. Finally, the obtained data may be transferred for visualisation.

FIG. 3a shows collected data set in frequency domain, such as collected by the process shown in FIG. 2. In this example data is collected from 0 Hz to 8.2 kHz and ranges from −2 to −53 dB relative to the dynamic range of the AD-converter of the system. Generally 0 Hz is not measurable, so in one embodiment the DC value is approximated by a measurement above DC (in order of kHz) often in combination with a correction factor said factor determined by a calibration procedure such as described in wo2006027369.

FIG. 3b shows the backscattering curve corresponding to the data plotted in FIG. 3a. The backscattering curve was obtained by an IFFT of the amplitude (shown in FIG. 3a) and the phase (not shown). The data ranges from −100 to 6000 meter and the amplitude ranges from 0 to about 23.5 dB. The measurement fiber corresponds to the first 4300 meter where any data above this value is random noise. The data for −100 to 0 meter corresponds to the internal additional length of optical fibre inside the evaluation part 11 used as a reference for temperature calculation.

FIG. 3C shows the temperature corresponding to the backscattering curve shown in FIG. 3b. The temperature was calculated based on the Stokes and anti-Stokes scattering as discussed above. The data shown ranges from 0 to about 4350 fiber positions and the temperature was measured to range from about 22.3 to about 53 degrees Celsius.

FIG. 4 shows an illustration of the amplitude of the measured dataset where the N data points (0 to N−1 fiber positions) each is a complex number $s_i$ designating the phase and amplitude of the measured response.

FIG. 5a shows a test setup comprising the system shown in FIG. 1, here shown as an evaluation unit 11. The measurement fiber 51 comprises an initial section of about 4200 m fiber followed by pairs of loops of varying sizes: 10 m, 5 m, 3 m and 1.5 m. For each pair one loop 53 is placed at room temperature and the other 54 is placed in an oven 52 at about 50 degrees. By this setup the accuracy and the spatial resolution of the system may be investigated by determining the system's ability to resolve the four loops inside the oven as well as report a correct temperature of the oven as well as surroundings. FIG. 5b is a plot of a measured temperature profile from such a test. Corresponding to the four loops a series of progressively narrower peaks is seen at fiber positions of approximately 4220, 4225, 4282 and 4310, respectively. The temperature reading for each peak ranges from about 47 to 52 degrees.

FIG. 6a is a flowchart of a measurement and data processing procedure according to the invention applied to an OFDR system as described in FIG. 1. In this example the primary data series consists of frequency data from DC to an upper value $f_{step} \times (N_{da}-1)$ and the filling series consists of frequency data for $f_{step} \times N_{da}$ to $f_{step} \times N$. In step 61 the number of data points in the primary, $N_{da}$, and secondary data, N, series are preset. In step 62 the counter variable i is set to zero. In steps 63 and 64 the hardware of the system is configured to measure the frequency $i \times f_{step}$ where $f_{step}$ is given by the highest measured frequency, $f_{stop}$, divided by the N. The maximum frequency, $f_{stop}$, is chosen to provide the desired spatial resolution, dz, of the system as $dz=c/(4 \cdot n_g \cdot f_{stop})$, where c is the speed of light and $n_g$ is the group velocity index of silica (the material of the optical fiber) at the wavelength being measured. In step 65 the response of the fiber, i.e. the reflected light, is measured. The amount of data collected for a single frequency is determined by the bandwidth of measurement. Step 66 includes data fetch, comprising the access of sample values of the AD-converters by the digital processing unit, and pre-processing, such as averaging of samples according to the measurement bandwidth, application of calibration factors to the phase and amplitude of each frequency point and creation of the relation to the phase and/or amplitude of reference channel. In steps 67 and 68 the counter variable is increased and it is tested whether another data point should be measured. In step 69 the secondary data series is generated by filling the primary data series with the filling series. In step 601 the secondary data series is processed to determine a temperature profile.

Figure 7A:
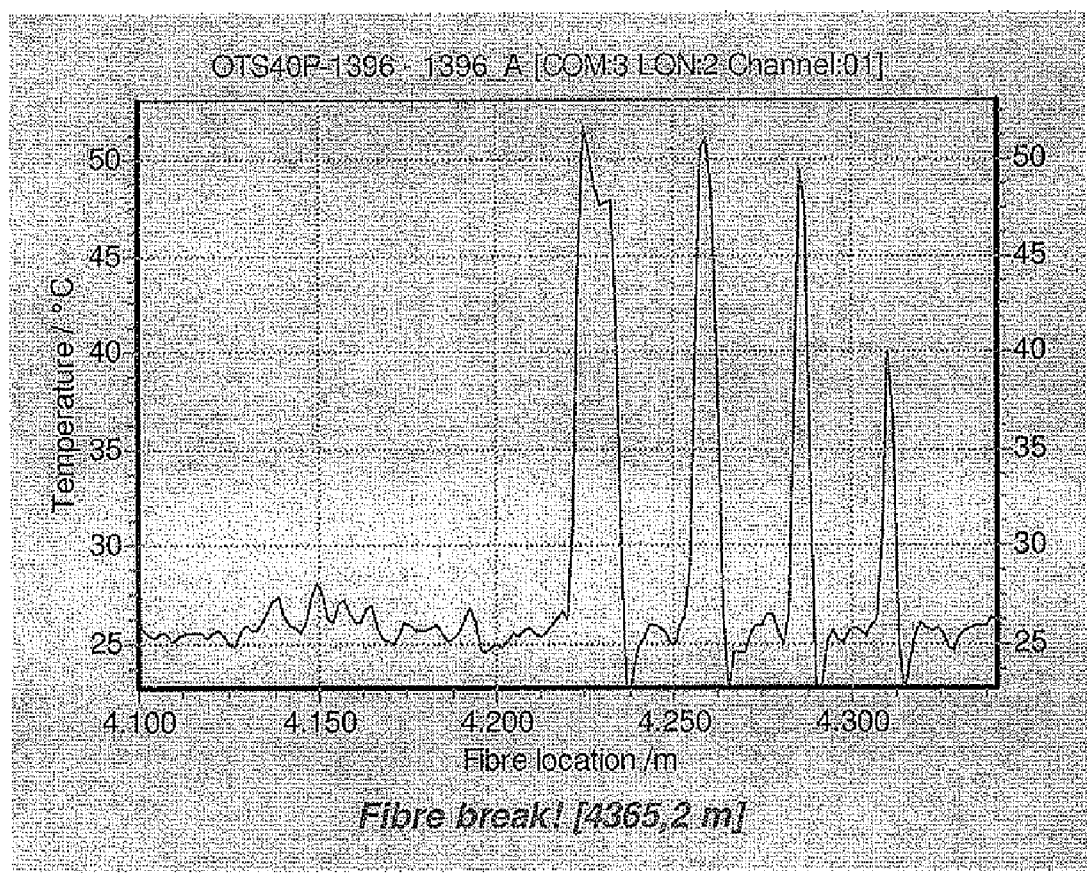
Figure 7B:
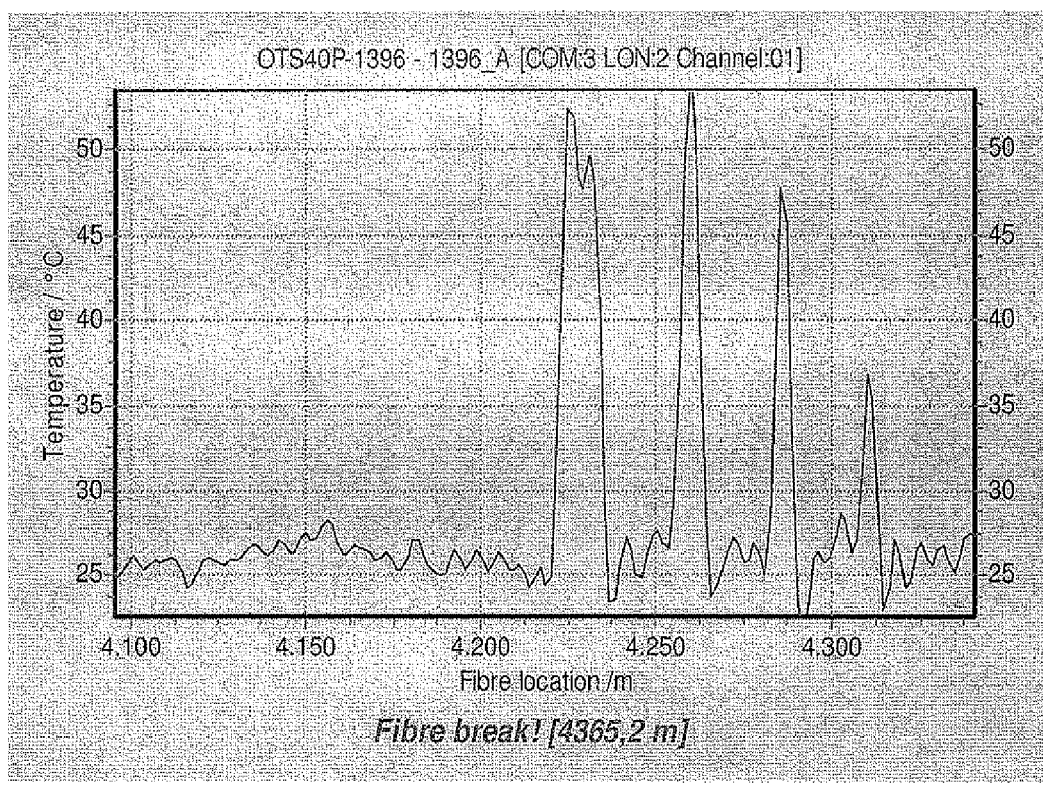
Figure 7C:
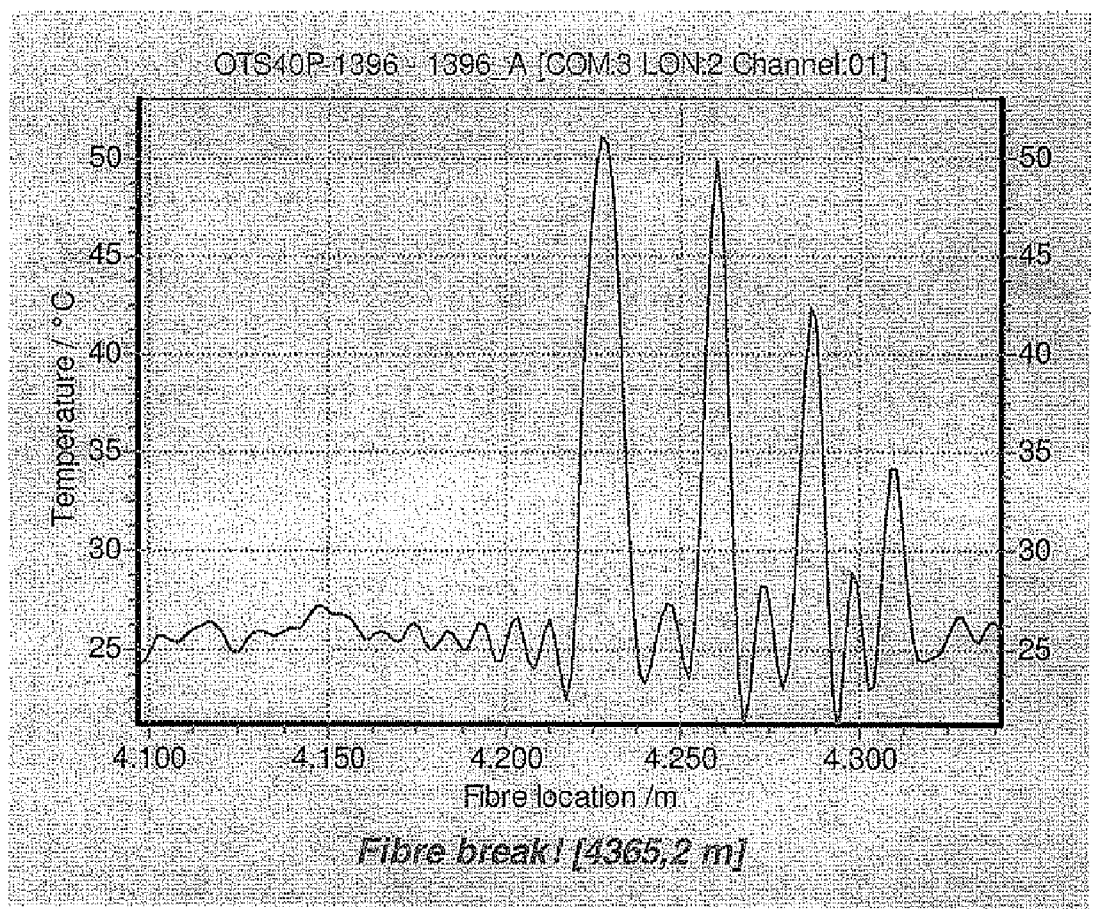

FIG. 7a-d shows plots of temperature profiles for the setup shown in FIG. 5a obtained using the procedure outlined in FIG. 6 for different values of Nda. The profiles have the following settings in common: N=4096, all profiles the fstop=32 MHz and the measurement bandwidth is 128 Hz. The values of the filling series were all set to 1+j. As reference the temperature profile in FIG. 7a was measured without applying the invention, so that Nda=N. The system had a total cycle time of 59.6 seconds. In FIG. 7b Nda=N/2 providing a reduction in measurement time to 32.1 seconds. Comparing the profiles of FIGS. 7a and 7b show a slight deviation in the magnitude of the peaks, which is likely to be insignificant in an application such as fire detection. In FIG. 7c Nda=N/3 providing a reduction in measurement time to 22.6 seconds. Comparing the profiles of FIGS. 7a and 7c show a slight broadening of the peaks and a slight increase in the noise between the peaks. This increase in noise is speculated to be due to sidelopes of a sinc function which may be said to be convoluted with each peak, said sinc arising from the Fourier transform of a function having the value 1 for all frequency values in the primary data series and 1+j for all frequency values in the secondary data series.

Figure 7D:
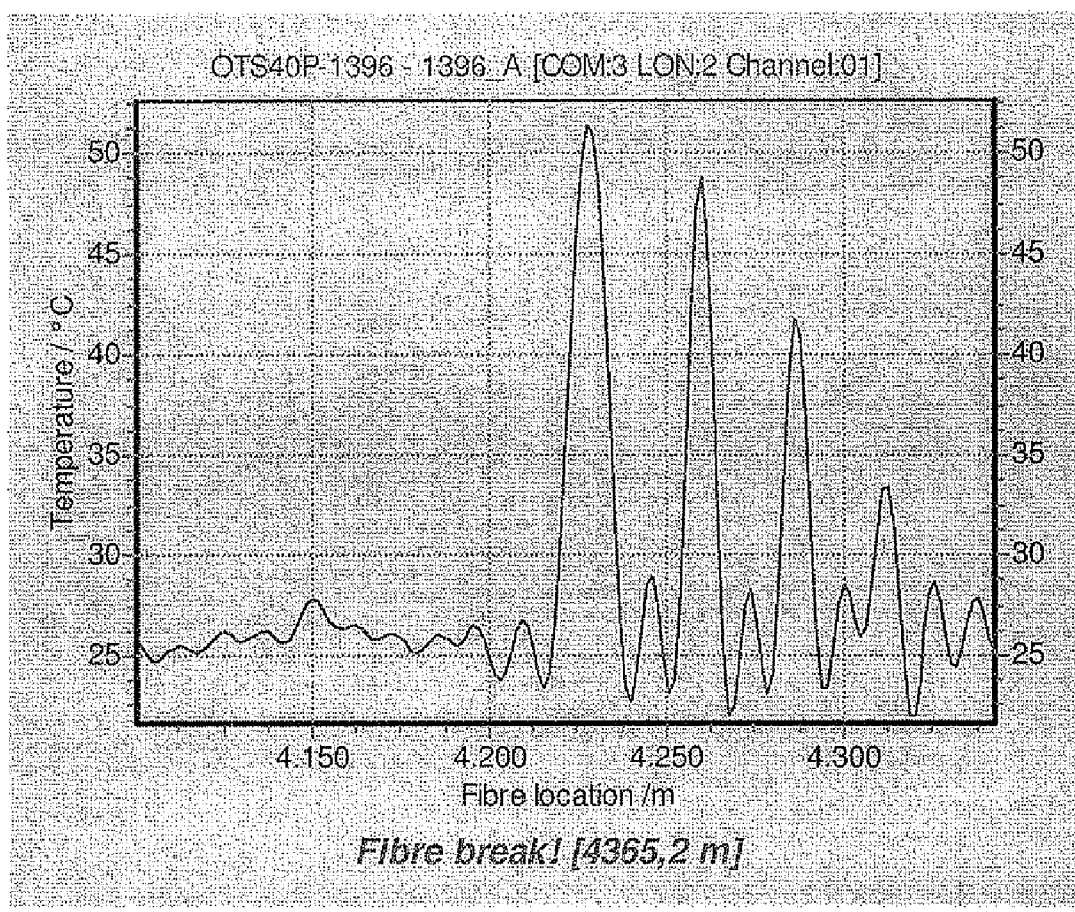

In FIG. 7d Nda=N/4 providing a reduction in measurement time to 18.1 seconds. Comparing the profiles of FIGS. 7a and 7d show an increase in the noise between the peaks compared to FIGS. 7b and 7c.

In FIGS. 7b-d 1+j was used a filling value. However, in principle any value may be used preferably so as to keep noise at a minimum. FIG. 10a-c show plots of the amplitude (a) and the phase (b) of the secondary as well as the resulting temperature profile (c) for a secondary data series obtained by the procedure of FIG. 6 from a setup as FIG. 5, with a filling series consisting of 1+j as a filling value. The resulting temperature profile shows an increase in noise towards the end of the fiber and the four peaks due to the loops residing in the oven (see FIG. 5). Similarly, FIG. 11a-c show the same graphs but the amplitude and phase of the last data point in the primary data series is used as a filling value instead of 1+j. Due to the smoother secondary data series less noise is introduced by the IFFT as seen by comparison of FIGS. 10c and 11c. FIG. 12a-c show the same graphs but a previously measured data series is used as the filling series. Compared to FIG. 11c the noise is increased in FIG. 12c probably due to the relatively high noise in the phase for high frequencies. It is speculated that using a noise free filling series for high frequencies which result in a relatively smooth secondary data series may provide a noise reduction simultaneously. Another alternative to using a preset filling value in interpolated could be to use a model to predict the measured values for high frequencies based on measurement of lower frequencies.

FIG. 8 is a flowchart of a measurement and data processing procedure according to the invention applied to an OFDR system as described in FIG. 1. In this example the primary data series comprises every other data point and the secondary data series fills in the remaining data points with data measured in the previous cycle. In step 801 the values for the number of data points in the filling series and the secondary data series are set. In step 802 the counter variable i and K are initialized, where k is used to track the cycle so that the position of the measured data points may alternate between cycles. Steps 803 to 806 correspond to steps 43 to 46 discussed regarding FIG. 4a. In step 807 it is checked which cycle is currently running. For the first cycle K=0 so that all values in the secondary data series are measured. For K values different from zero i=+2 so that every other data point is measured when the loop comprising step 803 to 810 runs. When the desired amount of data points, $N_{da}$, has been acquired the conditional step 810 directs the procedure towards step 814 to 816 which sets K so that conditional steps 811-813 will begin the next cycle at either i=0 or i=1, this resulting an alternating measurement of the primary data series. Step 817 fills the primary data series with previously measured data for any cycles except for the first cycle. Step 818 may be included in cases where the present example is combined with other embodiments of the invention such as the filling method discussed with regard to FIG. 4a. Step 819 may be any suitable data processing of the data in the frequency and/or spatial domain, such as IFFT of the secondary data series, calculation of the profile of the physical parameter, such as temperature, and any noise reduction etc. Preferably, the data processing of step 819 comprises a fiber break test. In the event of a break of a measurement fiber the reduced length of the fiber may not be clearly identifiable in the frequency domain and it may give a false measurement of the physical parameter when the measurement of reduced length is combined with the previous full length measurement. The fiber break test is preferably a reliability test which tests whether a change in the frequency data and/or the inverse Fourier transformed data is likely to be caused by a change in the physical parameter and/or whether a change in the frequency data is likely to be caused by a fiber break. Suitable test includes the determination of a change of calculated end of fibre in comparison to the previous measured cycle on the basis of analysis of the backscattering profiles. In case a change of length is determined the current measurement is preferably connected and a measurement of all data points in the secondary data series is carried out.

In the event of a fiber break the system preferably completes a full measurement where all data points in the secondary data series are remeasured.

FIGS. 9a and 9b show plots of temperature profiles of the setup of FIG. 5 obtained by the procedure of FIG. 8. For both cases N=4096, fstop=32 MHz, bandwidth=128 Hz. FIG. 9a is a reference measurement where all data of the secondary data series has been measured so that the present invention is not applied, whereas the procedure of FIG. 8 has been applied in FIG. 9b. Apart from minor deviations in the temperature values of the individual peaks little difference is apparent between FIGS. 9a and 9b supporting that the procedure of FIG. 8 may be suitable for reduction of cycle time.

The invention claimed is:

1. A frequency modulated continuous wave (FMCW) backscattering measurement system, comprising a non-transitory computer readable medium having stored thereon a computer readable program code for performing a method for processing a data series obtained by frequency modulated continuous wave (FMCW), the data series comprising data points from one or more channels, the method comprising:
   a. measuring a number of data points, corresponding to $N_{da}$ different values of frequency of modulation $\{f_{m,0}, f_{m,1}, f_{m,n}, \ldots, f_{m,Nda}\}$, thereby obtaining at least one primary data series from each channel,
   b. performing one or more processing steps comprising at least part of said primary data series to obtain at least one secondary data series comprising N data points for the values of frequency of modulation $\{f_0, f_1, f_n, \ldots, f_N\}$, said processing steps comprises filling in data points with a filling series $\{f_{f,0}, f_{f,1}, f_{f,n}, \ldots, f_{f,N-Nda}\}$ comprising values of frequency of modulation not included in $\{f_{m,0}, f_{m,1}, f_{m,n}, \ldots, f_{m,Nda}\}$,
   c. performing a transformation of said secondary data series from frequency domain to obtain at least one back scattering curve in space domain,
   d. optionally relating said back scattering curve(s) to one or more physical properties as a function of position,
   wherein $N > N_{da}$.

2. The FMCW backscattering measurement system of claim 1, wherein said filling series comprises previously selected values for one or more data points.

3. The FMCW backscattering measurement system of claim 1, wherein said filling series comprises data points based on the primary data series and/or one or more previously measured data points.

4. The FMCW backscattering measurement system of claim 1, wherein the filling series and the primary data series comprises an overlapping frequency interval where the data points of the filling series has an average spacing $\Delta f_f$, and the data points of the primary data series has an average spacing $\Delta f_m$, where $\Delta f_f$ is substantially equal to $\Delta f_m$.

5. The FMCW backscattering measurement system of claim 1, wherein the filling series and the primary data series comprises an overlapping frequency interval where the data points of the filling series has an average spacing $\Delta f_f$ and the data points of the primary data series has an average spacing $\Delta f_m$, where $\Delta f_f$ is equal to or less than $\Delta f_m$.

6. The FMCW backscattering measurement system of claim 1, wherein the filling series and the primary data series comprises an overlapping frequency interval where the data points of the filling series has an average spacing $\Delta f_f$ and the data points of the primary data series has an average spacing $\Delta f_m$, where $\Delta f_f$ is equal to or more than $\Delta f_m$.

7. The FMCW backscattering measurement system of claim 1, wherein the filling series and the primary data series comprises an overlapping frequency interval where the number of data points in the filling series is equal to or more than the number of data points in the primary data series.

8. The FMCW backscattering measurement system of claim 1, wherein the filling series and the primary data series comprises an overlapping frequency interval where the number of data points in the primary series is equal to or more than the number of data points in the filling series.

9. The FMCW backscattering measurement system of claim 4, wherein said overlapping frequency interval has a beginning frequency $f_{min}$ and an end frequencies $f_{max}$, where $f_{max}$ is a fraction of $f_N$.

10. The FMCW backscattering measurement system of claim 4, wherein said overlapping frequency interval has a beginning frequency $f_{min}$ and an end frequencies $f_{max}$, where $f_{min}$ is zero or a fraction of $f_N$.

11. The FMCW backscattering measurement system of claim 1, wherein at least one backscattering profile is determined to update a previously determined physical property as a function of position.

12. The FMCW backscattering measurement system of claim 11, wherein the set of measured frequencies of modulation $\{f_{m,0}, f_{m,1}, f_{m,n}, \ldots, f_{m,Nda}\}$ is substantially identical to the set of measured frequencies of modulation applied to determine the previously determined physical property as a function of position.

13. The FMCW backscattering measurement system of claim 12, wherein the set of measured frequencies of modulation $\{f_{m,0}, f_{m,1}, f_{m,n}, \ldots, f_{m,Nda}\}$ differ from the set of measured frequencies of modulation applied to determine the previously determined physical property as a function of position in at least one of the following ways: the number of measured frequencies of modulation, one or more values of the measured frequencies of modulation is omitted and one or more values of the measured frequencies of modulation is added.

14. A frequency modulated continuous wave (FMCW) system comprising
at least one excitation source and
an evaluation unit,
wherein the evaluation unit comprising one or more signal processing units, and wherein the one or more signal processing units comprises a non-transitory computer readable medium having a code therein when executed by said processing units for: (i) measuring a number of data points, corresponding to $N_{da}$ different values of frequency of modulation $\{f_{m,0}, f_{m,1}, f_{m,n}, \ldots, f_{m,Nda}\}$, thereby obtaining at least one primary data series from each channel; (ii) performing one or more processing steps comprising at least part of said primary data series to obtain at least one secondary data series comprising N data points for the values of frequency of modulation $\{f_0, f_1, \ldots, f_N\}$; said processing steps comprises filling in data points with a filling series $\{f_{f,0}, f_{f,1}, f_{f,n}, \ldots, f_{f,N-Nda}\}$ comprising values of frequency of modulation not included in $\{f_{m,0}, f_{m,1}, f_{m,n}, \ldots, f_{m,Nda}\}$; (iii) performing a transformation of said secondary data series from frequency domain to obtain at least one back scattering curve in space domain; (iv) optionally relating said back scattering curve(s) to one or more physical properties as a function of position, wherein $N > N_{da}$.

15. The FMCW backscattering measurement system of claim 1, wherein said filling series comprises previously measured data points.

16. A non-transitory computer readable medium comprising computer program code stored therein for causing a computer processor to perform a method for processing a data series obtained by frequency modulated continuous wave (FMCW), the data series comprising data points from one or more channels, the method comprising:
a. measuring a number of data points, corresponding to $N_{da}$ different values of frequency of modulation $\{f_{m,0}, f_{m,1}, f_{m,n}, \ldots, f_{m\,Nda}\}$, thereby obtaining at least one primary data series from each channel,
b. performing one or more processing steps comprising at least part of said primary data series to obtain at least one secondary data series comprising N data points for the values of frequency of modulation $\{f_0, f_1, f_n \ldots f_N\}$, said processing steps comprises filling in data points with a filling series $\{f_{f,0}, f_{f,1}, f_{f,n}, \ldots f_{f,N-Nda}\}$ comprising values of frequency of modulation not included in $\{f_{m,0}, f_{m,1}, f_{m,n}, \ldots, f_{m,\,Nda}\}$,
c. performing a transformation of said secondary data series from frequency domain to obtain at least one back scattering curve in space domain,
d. optionally relating said back scattering curve(s) to one or more physical properties as a function of position, wherein $N > N_{da}$.

17. The FMCW backscattering measurement system of claim 1, wherein the FMCW backscattering measurement system is an optical FMCW backscattering measurement system.

18. The FMCW backscattering measurement system of claim 2, wherein the previously selected values are 1, 0 and/or 1+j.

19. The FMCW backscattering measurement system of claim 3, wherein the data points are interpolated values, averages and/or the value of the closest measured data point.

20. The FMCW backscattering measurement system of claim 5, wherein $\Delta f_f$ is equal to or less than $\frac{1}{2}\Delta f_m$, $\frac{1}{3}\Delta f_m$, $\frac{1}{4}\Delta f_m$, $\frac{1}{5}\Delta f_m$, $\frac{1}{6}\Delta f_m$, $\frac{1}{7}\Delta f_m$, $\frac{1}{8}\Delta f_m$, $\frac{1}{9}\Delta f_m$, or $\frac{1}{10}\Delta f_m$.

21. The FMCW backscattering measurement system of claim 6, wherein $\Delta f_f$ is equal to or more than $2\Delta f_m$, $3\Delta f_m$, $4\Delta f_m$, $5\Delta f_m$, $6\Delta f_m$, $7\Delta f_m$, $8\Delta f_m$, $9\Delta f_m$, or $10\Delta f_m$.

22. The FMCW backscattering measurement system of claim 9, wherein the number of data points in the filling series is equal to or more than 2 times the number of data point in the primary data series, 3 times the number of data point in the primary data series, 4 times the number of data point in the primary data series, 5 times the number of data point in the primary data series, or 10 times the number of data point in the primary data series.

23. The FMCW backscattering measurement system of claim 8, wherein the number of data points in the primary series is equal to or more than 2 times the number of data point in the filling data series, 3 times the number of data point in the filling data series, 4 times the number of data point in the filling series, 5 times the number of data points in the filling series, or 10 times the number of data point in the filling series.

24. The FMCW backscattering measurement system of claim 9, wherein the end frequencies $f_{max}$ is a fraction of $1 f_N$, $\frac{3}{4} f_N$, $\frac{1}{2} f_N$, or $\frac{1}{4} f_N$.

25. The FMCW backscattering measurement system of claim 10, wherein the beginning frequency $f_{min}$ is $\frac{3}{4} f_N$, $\frac{1}{2} f_N$, $\frac{1}{4} f_N$.

* * * * *

UNITED STATES PATENT AND TRADEMARK OFFICE
CERTIFICATE OF CORRECTION

| | | |
|---|---|---|
| PATENT NO. | : 7,890,280 B2 | Page 1 of 1 |
| APPLICATION NO. | : 12/174144 | |
| DATED | : February 15, 2011 | |
| INVENTOR(S) | : Fomme | |

It is certified that error appears in the above-identified patent and that said Letters Patent is hereby corrected as shown below:

Title Page, item (12), "Fomme" should read -- Fromme --

Title Page, item (75), "Martin Fomme" should read -- Martin Fromme --

Column 9, line 11, "3/4 · $f_N$ N" should read -- 3/4 · $f_N$ --

Column 17, line 50, "$\{f_O, f_1,..., f_N\}$" should read -- $\{f_O, f_1, f_n,..., f_N\}$ --

Column 18, line 41, "claim 9" should read -- claim 7 --

Signed and Sealed this
Fourth Day of October, 2011

David J. Kappos
*Director of the United States Patent and Trademark Office*